US007132982B2

(12) United States Patent
Smith et al.

(10) Patent No.: US 7,132,982 B2
(45) Date of Patent: Nov. 7, 2006

(54) METHOD AND APPARATUS FOR ACCURATE AIRCRAFT AND VEHICLE TRACKING

(75) Inventors: Alexander E. Smith, McLean, VA (US); Carl Evers, Rockville, MD (US); Jonathan C. Baldwin, Alexandria, VA (US)

(73) Assignee: Rannock Corporation, Alexandria, VA (US)

( * ) Notice: Subject to any disclaimer, the term of this patent is extended or adjusted under 35 U.S.C. 154(b) by 0 days.

(21) Appl. No.: 10/743,042

(22) Filed: Dec. 23, 2003

(65) Prior Publication Data
US 2004/0189521 A1 Sep. 30, 2004

Related U.S. Application Data

(63) Continuation-in-part of application No. 10/638,524, filed on Aug. 12, 2003, now Pat. No. 6,806,829, which is a continuation of application No. 09/516,215, filed on Feb. 29, 2000, now Pat. No. 6,633,259, said application No. 10/743,042 is a continuation-in-part of application No. 10/457,439, filed on Jun. 10, 2003, and a continuation-in-part of application No. 10/319,725, filed on Dec. 16, 2002, now Pat. No. 6,812,890.

(60) Provisional application No. 60/440,618, filed on Jan. 17, 2003, provisional application No. 60/123,170, filed on Mar. 5, 1999.

(51) Int. Cl.
*G01S 3/02* (2006.01)

(52) U.S. Cl. .................................... 342/456; 342/454

(58) Field of Classification Search ................ 342/32, 342/37, 424, 456, 357.07, 357.06, 454; 701/120, 701/122
See application file for complete search history.

(56) References Cited

U.S. PATENT DOCUMENTS 3,668,403 A 6/1972 Meilander ................... 701/121

(Continued)

FOREIGN PATENT DOCUMENTS

JP 9-288175 A 11/1994

(Continued)

OTHER PUBLICATIONS

Traffic Alert System Technical Design Summary, Final Report, Apr. 1994 (Baldwin et al.).

(Continued)

*Primary Examiner*—Dao Phan
(74) *Attorney, Agent, or Firm*—Robert Platt Bell

(57) ABSTRACT

A direct multilateration target tracking system is provided with the TOA time stamp as an input. A technique of tracking targets with varying receiver combinations is provided. Methods of correlating and combining Mode A, Mode C, and Mode S messages to enhance target tracking in a passive surveillance system are provided. A direct multilateration target tracking system is provided by TOA tracking and smoothing. A technique for selecting best receiver combination and/or solution of multilateration equations from a multitude of combinations and/or solutions is provided. A technique for correcting pseudorange values with atmospheric conditions is provided. A technique for improving height determination for regions of poor VDOP in a 3D multilateration system is provided.

43 Claims, 22 Drawing Sheets

U.S. PATENT DOCUMENTS

| | | | |
|---|---|---|---|
| 3,705,404 A | 12/1972 | Chisholm | 343/112 R |
| 4,167,006 A | 9/1979 | Funatsu et al. | 343/6.5 LC |
| 4,196,474 A | 4/1980 | Buchanan et al. | 364/461 |
| 4,229,737 A | 10/1980 | Heldwein et al. | 343/6 R |
| 4,359,733 A * | 11/1982 | O'Neill | 342/36 |
| 4,454,510 A | 6/1984 | Crow | 343/5 |
| 4,524,931 A | 6/1985 | Nilsson | 246/167 |
| 4,688,046 A | 8/1987 | Schwab | 342/456 |
| 4,782,450 A * | 11/1988 | Flax | 701/301 |
| 4,914,733 A | 4/1990 | Gralnick | 340/961 |
| 5,075,694 A * | 12/1991 | Donnangelo et al. | 342/455 |
| 5,144,315 A | 9/1992 | Schwab et al. | 342/49 |
| 5,153,836 A | 10/1992 | Fraughton et al. | 364/461 |
| 5,191,342 A | 3/1993 | Alsup et al. | 342/465 |
| 5,262,784 A | 11/1993 | Drobnicki et al. | 342/45 |
| 5,268,698 A * | 12/1993 | Smith et al. | 342/450 |
| 5,365,516 A | 11/1994 | Jandrell | 370/18 |
| 5,374,932 A | 12/1994 | Wyschogrod et al. | 342/36 |
| 5,381,140 A | 1/1995 | Kuroda et al. | 340/961 |
| 5,402,116 A | 3/1995 | Ashley | 340/870.1 |
| 5,448,233 A * | 9/1995 | Saban et al. | 340/963 |
| 5,454,720 A | 10/1995 | FitzGerald et al. | 434/27 |
| 5,528,244 A * | 6/1996 | Schwab | 342/37 |
| 5,570,095 A | 10/1996 | Drouilhet, Jr. et al. | 342/357 |
| 5,596,326 A | 1/1997 | Fitts | 342/30 |
| 5,596,332 A | 1/1997 | Coles et al. | 342/455 |
| 5,627,546 A | 5/1997 | Crow | 342/352 |
| 5,629,691 A | 5/1997 | Jain | 340/961 |
| 5,680,140 A | 10/1997 | Loomis | 342/357 |
| 5,714,948 A | 2/1998 | Farmakis et al. | 340/961 |
| 5,752,216 A | 5/1998 | Carlson et al. | 701/120 |
| 5,774,829 A | 6/1998 | Cisneros et al. | 701/213 |
| 5,781,150 A | 7/1998 | Norris | 342/357 |
| 5,867,804 A | 2/1999 | Pilley et al. | 701/120 |
| 5,940,035 A * | 8/1999 | Hedrick | 342/462 |
| 5,999,116 A | 12/1999 | Evers | 342/36 |
| 6,049,304 A | 4/2000 | Rudel et al. | 342/357.08 |
| 6,085,150 A | 7/2000 | Henry et al. | 701/301 |
| 6,094,169 A | 7/2000 | Smith et al. | 342/465 |
| 6,133,867 A | 10/2000 | Eberwine et al. | 342/29 |
| 6,211,811 B1 * | 4/2001 | Evers | 342/36 |
| 6,219,592 B1 | 4/2001 | Muller et al. | 701/9 |
| 6,292,721 B1 | 9/2001 | Conner et al. | 701/9 |
| 6,314,363 B1 | 11/2001 | Pilley et al. | 701/120 |
| 6,347,263 B1 | 2/2002 | Johnson et al. | 701/14 |
| 6,380,870 B1 | 4/2002 | Conner et al. | 340/970 |
| 6,384,783 B1 | 5/2002 | Smith et al. | 342/387 |
| 6,445,310 B1 | 9/2002 | Bateman et al. | 340/970 |
| 6,448,929 B1 | 9/2002 | Smith et al. | 342/456 |
| 6,469,664 B1 | 10/2002 | Michaelson et al. | 342/357.13 |
| 6,477,449 B1 | 11/2002 | Conner et al. | 701/4 |
| 6,571,155 B1 | 5/2003 | Carriker et al. | 701/3 |
| 6,606,034 B1 | 8/2003 | Muller et al. | 340/970 |
| 6,633,259 B1 | 10/2003 | Smith et al. | 342/456 |
| 2002/0021247 A1 | 2/2002 | Smith et al. | 342/450 |
| 2003/0009267 A1 | 1/2003 | Dunsky et al. | 701/4 |
| 2003/0169335 A1 * | 9/2003 | Monroe | 348/143 |

FOREIGN PATENT DOCUMENTS

| | | | |
|---|---|---|---|
| JP | 6-342061 A | 12/1994 | |
| JP | 8-146130 A | 5/1996 | |
| JP | 9-119983 A | 11/1996 | |

OTHER PUBLICATIONS

AIRSCENE, The complete Air Traffic Picture in Real Time, www.airscene.com, Rannoch Corporation, Alexandria, Virginia, undated.

GPS Relative Accuracy for Collision Avoidance, Institute of Navigation Technical Meeting, Jan. 1997 (Rudel et al.).

Cassell, R., Smith A., Cohen, B., Yang, E., Sleep, B., A Prototype Aircraft Performance Risk Assessment Model, Final Report, Rannoch Corporation, Feb. 28, 2002.

Cassell, R., Smith A., Cohen, B., Yang, E., Sleep, B., Esche, J., Aircraft Performance Risk Assessment Model (APRAM), Rannoch Corporation, Nov. 30, 2002.

Cox, E., A., Fuzzy Logic For Business and Industry, Charles River Media, 1995, Chapter 5.

Smith, A., Cassell, R., Cohen, B., An approach to Aircraft Performance Risk Assessment Modeling, Final Report, Rannoch Corporation, Mar. 1999.

M.L. Wood and R. W. Bush, "Multilateration on Mode S and ATCRBS Signals at Atlanta's Hartsfield Airport", Lincoln Laboratory, M.I.T., Jan. 8, 1998.

AERMOD: Description of Model Formulation (Version 02222) EPA 454/R-02-002d, Oct. 21, 2002.

FAA Integrated Noise Model, www.faa.gov, current release INM 6.1 (Mar. 4, 2003).

"Flight Explorer News: Flight Explorer and Lochard Team to Provide Enhanced Flight Tracking for Cutomers Worldwide", Apr. 28, 2003, http://www.flightexplorer/com/News/press%20releases/pr042803.asp.

Source Code received by Rannoch Corp. from FAA, circa 1998.

"A Routine that converts an American Mode S address into its corresponding 'N' number string", Ken Banis, Feb. 17, 1992.

"Description of the U.S. Algorithm for Assigning Mode A Addresses", Robert D. Grappel, M.I.T. Lincoln Laboratory, Nov. 1991.

"Program to convert Mode S address to U.S. Tail Number", R.D. Grappel, M.I.T. Lincoln Laboratory, 1991.

"Program to convert U.S. aircraft tail numbers to Mode S code", R.D. Grappel, M.I.T. Lincoln Laboratory, 1991.

"ADSE and Multilateration Mode-S Data Fusion for Location and Identification on Airport Surface", J.G. Herraro J.A. Portas, F.J. Rodriguez,(*IEEE 1999 Radar Conference Proceedings*, pp. 315-320, Apr. 20-22, 1999).

D.C. Rickard, D.J.Sherry, S.J.Taylor, "The development of a prototype aircraft-height monitoring unit utilising an SSR-based difference in time of arrival technique", International Conference Radar 92 (Conf. Publ. No. 365), 1992, p. 250-3.

D. E. Manolakis and C. C. Lefas, "Aircraft geometric height computation using secondary surveillance radar range differences," IEE Proceedings-F, Radar, Sonar, Navigation, vol. 141, No. 2, pp. 139-148, 1994.

Request for Proposal: Noise and Operations Monitoring System, Indianapolis Airport Authority, Indianapois, Indiana, Sep. 29, 2003.

Attachment A: Technical Specifications for a Aircraft Flight Track and Noise Managment System for the Regional Airport Authority of Louisville and Jefferson County, Harris Miller Miller & Hanson, Inc., May 19, 2003.

Application of CNS/ATM Technologies to Airport Management, Alex Smith and Jon Baldwin, Rannoch Corporation, Alexandria, Virginia.

Overview of the FAA ADS-B Link Decision, John Scardina, Federal Aviation Administration, Jun. 7, 2002.

Automated Correlation of Aircraft Flight Tracks and Events With ATC Data, Alex Smith, Rannoch Corporation, Alexandria, Virginia.

Department of Transportation Federal Aviation Administration System Specification, Ground-Based Transceiver (GBT) for Broadcast Services Using the Universal Access Transceiver (UAT) Data Link, FAA-E-2973, Jan. 15, 2004.

Protest Letter dated May 16, 2002 from Otto M. Wildensteiner, U.S. Department of Transportation, Washington, DC.

"Comparison of Claims in U.S. Appl. No. 09/971,672 with Prior Art", May 16, 2002, Otto M. Wildensteiner, Department of Transportation, Washington, DC.

"Minimum Aviation System Performance Standards for Automatic Dependent Surveillance Broadcast (ADS-B)", RCTA, Inc. Washington, DC, © 1998.

"Runway Incursion Reduction Program Dallas-Ft. Worth Formal Evaluation Report, Final Report", Trios Associates, Inc. Dec. 21, 2000.

"TIS-B DFW Application for Airport Surface Situational Awareness", Trios Associates, Inc., Sep. 6, 2000.

"A Prototype Transceiver for Evaluating An Integrated Broadcast Data Link Architecture", Chris Moody & Warrent Wilson, RCTA SC-186, Aug. 17, 1995, RTCA Paper No. 449-95/SC186-033.

"The Universal Access Tranceiver (UAT)", Warren Wilson & Chris Moody, May 10, 1995.

"Terminal Area Productivity (TAP) Study Low Visibility Landing and Surface Operations (LVLASO) Demonstration Report" Surface Surveillance Products Team (AND-410) Sep. 4, 1998.

"Phase I—Operational Evaluation Final Report Cargo Airline Association ADS-B Program, FAA SafeFlight 21 Program" Apr. 10, 2000.

"Capstone Program Plan Version 1.0", Federal Aviation Administration, Mar. 10, 1999.

"TIS-B Concept and Approach", MITRE, Chris Moody, Feb. 29, 2000.

"RTCA Special Commmittee 186, Working Group 5 ADS-B UAT MOPS Meeting #2, Proposed Contents and Transmission Rates for ADS-B Messages" Chris Moody, MITRE Corp., Feb. 20, 2001.

"Airborne Information Initiatives: Capitalizing on a Multi-Purpose Broadcast Communications Architecture", R.C. Strain, J.C. Moody, E.C. Hahn, B.E. Dunbar, S. Kavoussi, J.P. Mittelman, Digital Avionics Systems Conference, Oct. 1995.

"Minutes of SC-186 WG-2 (TIS-B) Meeting", Jun. 13-14, 2000.

* cited by examiner

METHOD AND APPARATUS FOR ACCURATE AIRCRAFT AND VEHICLE TRACKING

CROSS-REFERENCE TO RELATED APPLICATIONS

The present application is a Continuation-In-Part application of U.S. patent application Ser. No. 10/638,524, filed Aug. 12, 2003, entitled "METHOD AND APPARATUS FOR IMPROVING THE UTILITY OF AUTOMATIC DEPENDENT SURVEILLANCE", which is incorporated herein by reference in its entirety, which in turn is a Continuation of U.S. patent application Ser. No. 09/516,215, filed on Feb. 29, 2000, which in turn claims priority from Provisional Application Ser. No. 60/123,170, filed Mar. 5, 1999, both of which are incorporated herein by reference in its entirety.

The present application is also a Continuation-In-Part of U.S. patent application Ser. No. 10/319,725, filed Dec. 16, 2002, entitled "VOICE RECOGNITION LANDING FEE BILLING SYSTEM", incorporated herein by reference in its entirety.

The present application is also a Continuation-In-Part of U.S. patent application Ser. No. 10/457,439, filed Jun. 10, 2003 entitled "Correlation of Flight Track Data with Other Data Source", incorporated herein by reference in its entirety.

The present application also claims priority from Provisional U.S. Patent Application No. 60/440,618, filed Jan. 17, 2003, incorporated herein by reference in its entirety.

The subject matter of the present application is related to the following issued U.S. Patents, assigned to the same assignee as the present invention, all of which are incorporated herein by reference in their entirety:

a. U.S. Pat. No. 6,049,304, issued Apr. 11, 2000, entitled "Method and Apparatus for Improving the Accuracy of Relative Position Estimates In a Satellite-Based Navigation System";

b. U.S. Pat. No. 5,999,116, issued Dec. 7, 1999, entitled "Method and Apparatus for Improving the Surveillance Coverage and Target Identification in a Radar Based Surveillance System";

c. U.S. Pat. No. 6,094,169, issued Jul. 25, 2000, entitled "Passive Multilateration Auto-Calibration and Position Error Correction";

d. U.S. Pat. No. 6,384,783, issued on May 7, 2002, entitled "Method and Apparatus for Correlating Flight Identification Data With Secondary Surveillance Radar Data";

e. U.S. Pat. No. 6,633,259, issued Oct. 14, 2003, entitled "METHOD AND APPARATUS FOR IMPROVING THE UTILITY OF AUTOMATIC DEPENDENT SURVEILLANCE";

f. U.S. Pat. No. 6,211,811, issued Apr. 2, 2001, entitled "Method and Apparatus for Improving the Surveillance Coverage and Target Identification in a Radar Based Surveillance System";

g. U.S. Pat. No. 6,448,929, issued Sep. 10, 2002, entitled "Method and Apparatus for Correlating Flight Identification Data With Secondary Surveillance Radar Data"; and h. U.S. Pat. No. 6,567,043, issued May 20, 2003, entitled "METHOD AND APPARATUS FOR IMPROVING THE UTILITY OF AUTOMATIC DEPENDENT SURVEILLANCE".

FIELD OF THE INVENTION

The present invention relates to the field of aircraft tracking and identification. The present invention is specifically directed toward a technique for passively retrieving and correlating aircraft data from existing aircraft data sources. Six embodiments of present invention are described wherein aircraft flight track may be calculated and correlated with other data or where flight track data may be enhanced with other data.

BACKGROUND OF THE INVENTION

The Federal Aviation Administration (FAA) requires all passenger carrying aircraft over 30 seats be equipped with so-called "Mode S" transponders. Mode S transponders are capable of transmitting a number (e.g., 25) of formats of coded data. This coded data includes such information as a unique 24-bit binary address for each aircraft.

The aircraft registration number may be derived from this 24-bit binary address. The coded Mode-S data also includes such information as aircraft altitude and may be transmitted continuously throughout a flight at a minimum rate of 1 Hz (i.e., once per second). Coded Mode-S data may be collected passively without any connection to air traffic control equipment.

The FAA has endorsed the Aircraft Communications Addressing and Reporting System (ACARS) system, which uses various data link technologies including the VHF communication band, HF and SATCOM along with a ground station network to allow aircraft to transmit and receive messages of coded data. Many domestic and international carriers have equipped their aircraft with ACARS equipment.

ACARS equipment is capable of transmitting a number of types of coded data. ACARS currently uses frequency shift keying (FSK) as a modulation scheme, however, other modulation schemes including minimum shift keying (MSK) and time division multiple access (TDMA) are being evaluated for future improvement of ACARS. ACARS data includes such information as the aircraft registration number and airline flight identification number (flight number).

ACARS transmissions from a single aircraft may be sent at varying intervals from as little as no transmissions in a single flight to several transmissions per minute. ACARS transmissions may be collected passively without any connection to air traffic control equipment.

Triangulating on an aircraft's transponder signal may require decoding real-time transponder replies at several locations, time-stamping them and sending them to a central location for matching. Matching would attempt to pair up the transponder signals that had emanated from the same target.

An example of a Prior Art method for triangulating on an aircraft's transponder is disclosed in Wood, M., L., and Bush, R., W., *Multilateration on Mode S and ATCRBS Signals at Atlanta's Hartsfield Airport*, Lincoln Laboratory Project Report ATC-260, 8 Jan. 1998, incorporated herein by reference. In that method, triangulation on an aircraft's transponder relied on each remote sensor time-stamping all or most received transponder signals and passing them along to the central location for matching.

It was deemed necessary to do this since the remote sensor could not know which particular reply would be used by the central server for the matching process. This meant that a relatively high bandwidth communications medium was required between each remote sensor and the central server.

Such Prior Art methods used active interrogations to elicit the transponder replies, which allowed for some form of expectancy time for the replies. By scheduling interrogations the system estimated when replies might be received at each of the receivers and the system could then use windows in which to "listen" for replies. All replies received within these windows would then be time-stamped and then sent to the central server for matching.

This approach helped in some form to manage the required bandwidth on the link between the receiver and the central server. However, a relatively high bandwidth link is still required using this approach. Because of the practical bandwidth challenges in managing the link between the receivers and the central server it was generally thought in the Prior Art that using a completely passive approach for triangulation and multilateration would be impossible.

Multilateration and ASDI may be augmented with airline flight information available from an airlines flight reservation system. Dunsky et al, U.S. patent application Ser. No. 10/136,865, filed May 1, 2002 (Publication Number 2003/0009261 A1, published Jan. 9, 2003) entitled "Apparatus and method for providing live display of aircraft flight information", incorporated herein by reference, describes the integration of Megadata's Passive Secondary Surveillance Radar (PASSUR) and airline flight information.

Multilateration may be used for a number of purposes. Flight tracks may be recorded and displayed for informational purposes for airlines, the general public, or for government agencies. Thus, an airline or consumers may be able to determine location of aircraft, or a government agency may be able to track aircraft for noise measurement purposes. Airports may be able to use such multilateration techniques to track landings and takeoffs and for billing landing fees. Multilateration may also be used to track ground vehicles or other targets.

Multilateration may be used to create a 2-D or 3-D track, depending upon application. In some applications, a 3-D track (including altitude) may not be required, such as for gross tracking of aircraft for an airline or the like. For other applications, such as noise measurement or landing fee tracking, a 3-D track (including altitude information) may be required.

When generating aircraft tracks from multilateration data, situations may occur in which multiple tracks are generated for the same aircraft. Due to the plethora of transponder types and formats (e.g., Mode A, Mode C, and Mode S), multiple transponder signals and signal types may be generated in response to interrogations from ground equipment or as the result of squawks and the like. A multilateration system may interpret these multiple signals as being from different aircraft, due to the different formatting of the signal types, and generate multiple tracks for the same aircraft. Thus, it remains a requirement in the art to detect such multiple tracking and combine track data into a single track for each aircraft.

In a multilateration target tracking system, not all sensors are able to supply a TOA (data time stamp) value for every single reply message of any target. Because of geographical placement of sensors and the statistic nature of TOA measurement noise, these diverse sets of sensor TOA combinations yield raw multilateration equation solutions that spread all over the place, even from one message to the next. In order to accurately track a target, it may be necessary to use different combinations of receivers to generate a complete target track. A technique is thus required to determine which combination of receivers to use in order to generate the most accurate possible target track.

Thus, it remains a requirement in the art to provide a multilateration system which can more accurately track aircraft or other vehicles by eliminating the inaccuracies noted above as well as other effects that affect accuracy of multilateration data as will be discussed in more detail below.

SUMMARY OF THE INVENTION

The present invention includes a number of improvements on Prior Art techniques and the techniques of the present inventors and Rannoch Corporation to improve the accuracy of aircraft and vehicle tracking.

In a first embodiment, a direct multilateration target tracking system is provided with the TOA time stamp as an input. For the purposes of the present application, the term "TOA" is construed to mean the date stamp indicating what time a signal arrived at a multilateration receiver. It does not refer to the time the signal took to transit from the target to the receiver.

In this embodiment, the system is a standalone 2D target tracking system using the extended Kalman Filter technique. The state variables in the model are target x-y positions and velocities. The filter model is based on linearized statistical target dynamics state equations and statistical measurement equations. Depending on the type of target movement, the dynamics state equations may be one of the two forms: one optimized for linear constant-speed motion, and the other optimized for targets under longitudinal or lateral accelerations. The measurement equations are defined by time-difference of arrival (TDOA) equations, with random noise characterizing the error in TOA measurements.

In a second embodiment, a technique of tracking targets with varying receiver combinations is provided. In this second embodiment, program memory is set up to record the sensor combination used in the previous track update process. A set of rules has been developed on determining the optimal sensor combination for the measurement equation in the extended Kalman Filter model. The first choice is to go with the same sensor combination as the previous measurement. Doing so improves track accuracy and smoothness. If the same sensor combination as the previous set cannot be found, but a common subset of at least three sensors may be found in both measurements, this common subset of sensor combination will receive priority consideration; otherwise, the sensor combination with the lowest HDOP will be chosen.

In a third embodiment of the present invention, methods of correlating and combining Mode A, Mode C, and Mode S messages to enhance target tracking performance in a passive surveillance system are provided. The foundation of correlation of Mode A, Mode C, and Mode S messages and combination two or more of them into one single data stream to enhance tracking performance is built around a track memory system which includes not only track state variables but also selective recent history of sensor data for the target of concerns, including TOA with sensor ID, signal strengths, the list of sensors chosen to contribute to tracking solutions. Past messages may then be retrieved and be compared side-by-side with new target messages for matches.

In a fourth embodiment of the present invention, a direct multilateration target tracking system is provided by pseudorange tracking and smoothing. This fourth embodiment is a variation of the first embodiment of the present invention. The main idea is that a target filter-tracking system with state variables following closely with the measured quantities is more likely to be mathematically more well behaved. In place of target x-y positions and velocities, this tracking system use pseudoranges and the x-y velocities as state variables in a extended Kalman filtering model.

Using pseudoranges and x-y velocities as state variable allows the system operates in a high dimensional space as opposed to simply 2D in the previous multilateration surveillance tracking system, and thus keeping the full amount of information from the multitude of sensors in the tracker memory towards more effective tracking and filtering down the stretch. The additional advantage provided by this new tracking system is that it often allows missing TOA data from some sensors to be filled in. Smoother target position tracks may be obtained when the system is capable of drawing upon a larger set of TOA data as the effective HDOP usually becomes smaller.

In a fifth embodiment of the present invention, a technique for selecting best receiver combination and/or solution of multilateration equations from a multitude of combinations and/or solutions is provided. At different times, the TOA data for a particular target may come from a multitude of sensor combinations. Because of geographical placement of sensors, measurement uncertainties and other factors affecting time-stamping of TOA at individual sensors, solutions to the multilateration equations vary with the sensor combination chosen. In certain cases, two equally valid solutions may even exist.

In a sixth embodiment of the present invention, a technique for correcting pseudorange values with atmospheric conditions is provided. Wave propagation speed in the troposphere varies with elevation, with speed generally increasing with altitude, although there are exceptions in the presence of extreme humidity and temperature conditions. The refraction effect causes the propagation path to bend downward to the Earth surface.

In a seventh embodiment of the present invention, a technique for improving height determination for regions of poor VDOP in a 3D multilateration system is provided. In a 3D multilateration system, optimum HDOP and optimum VDOP may not occur at the same locations and may be coming from the same sensor combination. This makes it more difficult to achieve consistent 3D tracking performance, especially for height determination applications.

A new height determination algorithm is developed to obtain better vertical accuracy in places with good HDOP. This algorithm is built upon the 2D tracking system, taking advantage of the altitude information contained in Mode C and Mode S messages that make possible robust 2D tracking of horizontal positions. For any given time, a modified set of 3D multilateration equations may be formed by setting the x-y position of the target with that given by the 2D tracking system. The solution of the unknown altitude may then be obtained by the least-squares technique. The effective DOP under this modified set of multilateration equations is generally better than that given by the full 3D multilateration equation. For target locations with good HDOP in the 2D tracking system, this approach is capable of improving the vertical accuracy significantly.

DETAILED DESCRIPTION OF THE INVENTION

The present invention is now described with reference to the Figures where like reference numbers denote like elements or steps in the process.

Figure 1:
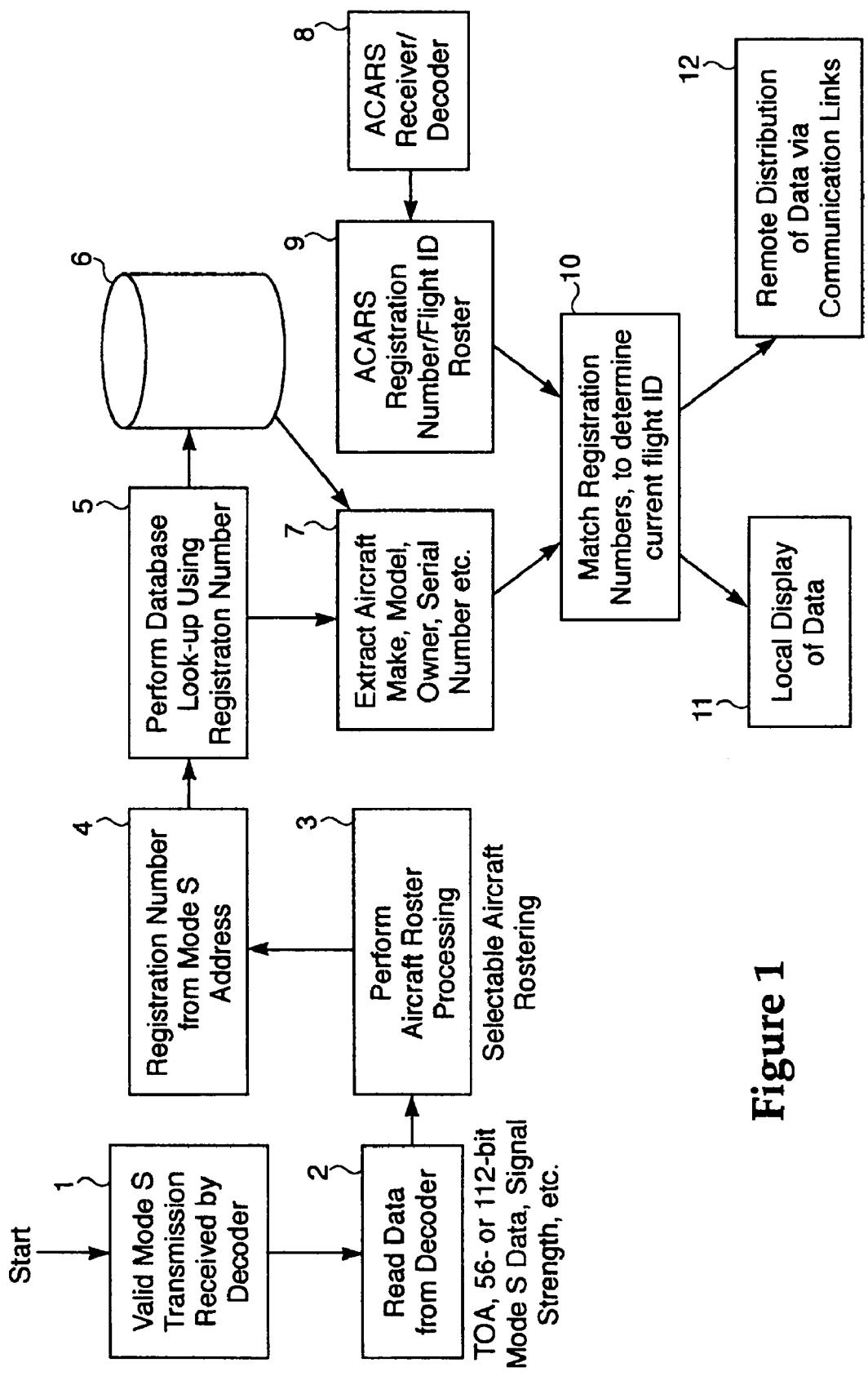
FIG. 1 is a flow chart of a process for decoding secondary surveillance radar transmissions, decoding ACARS transmissions, and correlating flight identifications from ACARS with registration details from both SSR and ACARS.

Referring to FIG. 1, 1090 MHz, Mode S transponder signals are received by a receiver/decoder in step 1. In step 1, the received analog Mode S signal may be converted to digital data. In step 2, the Mode S address may be extracted from the digital data. The Mode S address may then be stored in a roster in step 3 and used to generate the aircraft registration or "N" number, which may be extracted in step 4. U.S. aircraft registration numbers may be determined directly by an algorithm, while foreign aircraft registrations may be determined by a lookup table. Alternately, both U.S. and/or foreign aircraft registrations may be determined by using a lookup table.

The aircraft registration number from step 4 may then be used to perform a database look-up in step 5. Step 5 utilizes a database 6 which may contain details of aircraft make, model, serial number, owner/operator, owner/operator address, engine type, engine noise class, engine modifications and any other pertinent data associated with a particular aircraft. Such data may be extracted in step 7.

Simultaneously or concurrently with Mode-S decoding, a receiver/decoder capable of receiving and decoding ACARS signals receives and decodes such signals as illustrated in step 8. ACARS transmission may occur over VHF frequencies such as 131.550 MHz, 130.025 MHz, 129.125 MHz, 131.725 MHz, 131.450 MHz, 131.550 MHz, and 131.475 MHz, and/or HF and/or SATCOM and/or any other data link method and/or any other modulation scheme, including VDL Mode 1, 2, 3 or 4.

Aircraft registration number and flight ID number, as well as other ACARS message details, including but not limited to, "Out, Off, On and In" reports, cockpit message reports, fuel reports, peripheral message reports and miscellaneous message reports are then stored in a roster in step 9. Data from step 9 may then be matched with data from step 7. In step 10, aircraft registration numbers from steps 7 and 9 are matched to determine flight identification number.

The flight identification number may be thereby associated with the corresponding aircraft registration number as a result of step 10. If there is no correlation between registration numbers from steps 7 and 10, the data may also be stored. The resultant information from steps 7, 9, and 10 may then be displayed locally over a display terminal in step 11 and/or distributed to remote locations via communication links as illustrated in step 12.

Figure 2:
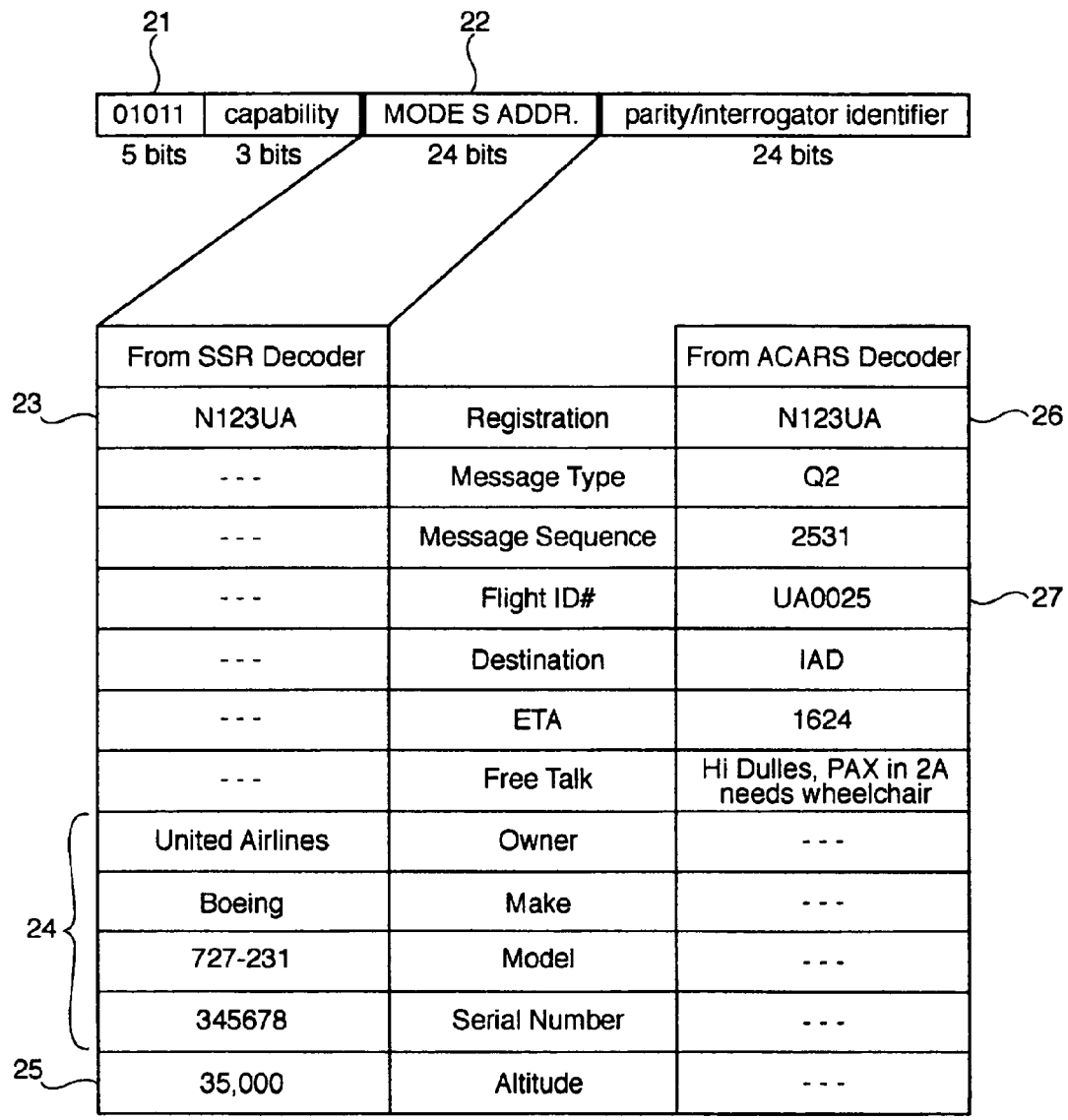
FIG. 2 is a diagram of DF-11 Mode S transponder transmission data and ACARS data, indicating the position of the Mode S address from within a Mode S transmission and illustrating the association between the Mode S address and derived registration data.

Referring to FIG. 2, a DF-11 Mode S transponder transmission 21 may be received and aircraft Mode S address 22 may be extracted. Mode S address 22 may be either converted to a U.S. aircraft registration number 23 through an algorithm or determined to be a non-U.S. registered aircraft whose registration may be looked-up from a database. Data 24 associated with a particular registration number, such as aircraft owner, make, model, and serial number may then be looked-up from a database. Aircraft altitude 25 may be decoded from other Mode S transponder signals which include altitude information.

Simultaneously or concurrently, ACARS messages are also received and decoded and data such as aircraft registration 26 and flight ID 27, as well as all other ACARS message data may be stored in a database and memory. All the aforementioned data available from the Mode S transponder transmission may then be correlated with ACARS message data by matching registration number 23 from the SSR decoder with registration number 26 from the ACARS decoder.

The resultant correlated data, as illustrated in FIG. 2, contains a host of information specifically identifying an aircraft. Such information, when correlated with multilateration data, may provide a complete and accurate picture of aircraft identity and position. Such information may be useful to an airline in tracking individual aircraft for business planning purposes. In addition, such information may be used for ground tracking purposes (e.g., for noise abatement verification). Moreover, such data may be re-transmitted on a data channel to other aircraft to provide a real-time display of aircraft in the vicinity.

Figure 3:
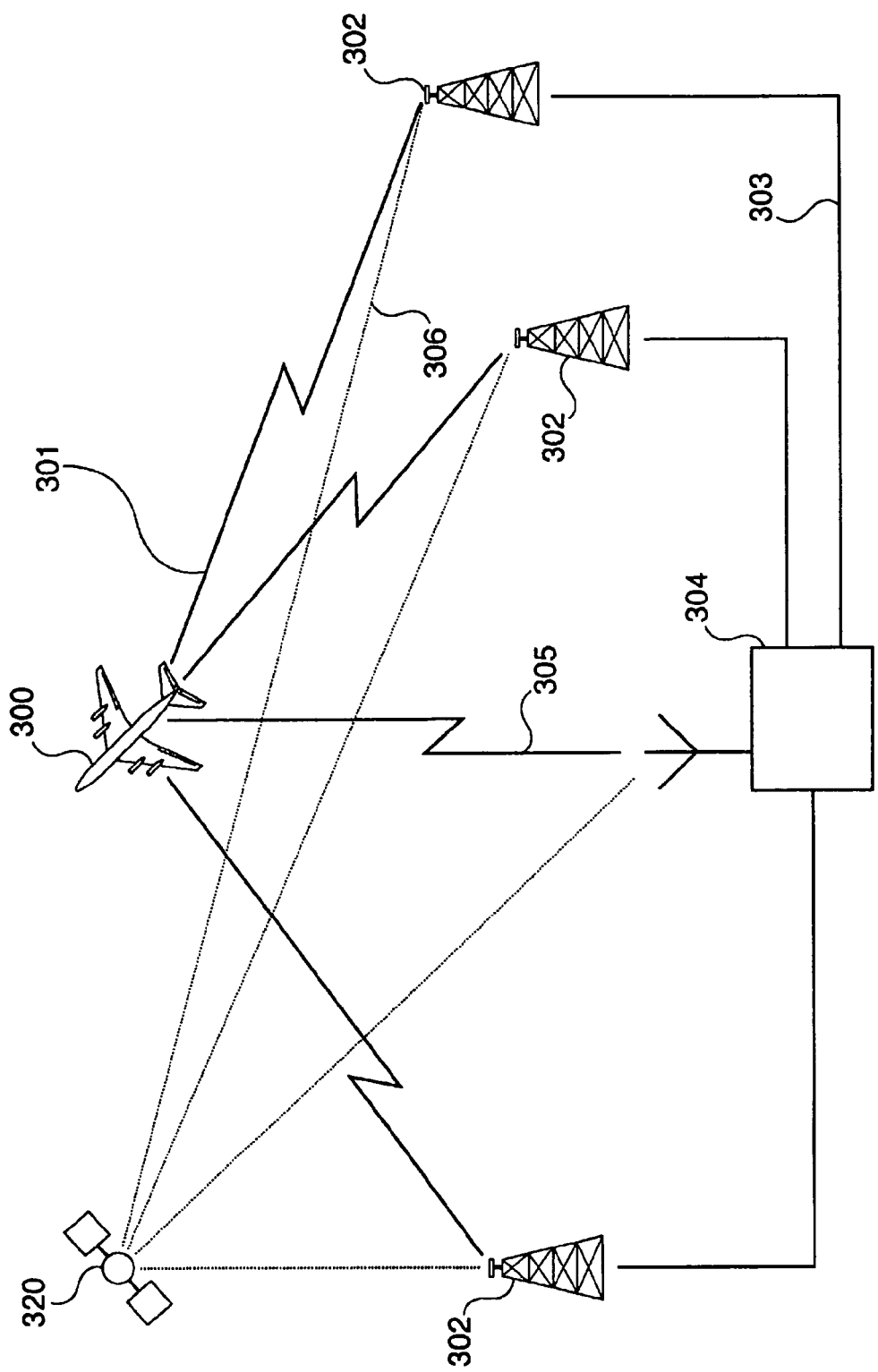
FIG. 3 is a diagram of an aircraft multilateration system that integrates SSR and ACARS data.

Referring to the embodiment depicted in FIG. 3, the integration of ACARS and SSR data is shown with an aircraft multilateration system. Aircraft 300 transmits SSR signals 301 at least once per second. SSR signals 301 may be received at one or more of multiple ground stations 302. The time of arrival at each ground station may be determined by reference to a standard time reference provided by GPS signal 306 from GPS satellite 320.

One or more of ground stations 302 may then send time-stamped SSR data 303 to central workstation 304. Time-stamped SSR data 303 includes the Mode S address of aircraft 300 which may be unique to every aircraft and may be correlated to a registration number. At central workstation 304 a processor then calculates the position of the aircraft using difference time of arrival (DTOA) techniques. The aircraft's location and registration number are then known and may be displayed to a user.

Also at the central workstation 304, ACARS data may be received and modulated, providing a roster or look-up table between registration number and aircraft assigned flight number. Thus, the entire system provides an independent air traffic control picture complete with aircraft position and identification by flight number, using only passive radio reception techniques.

In one preferred embodiment, an adaptive or learning database of aircraft registration information and related details may be implemented as database 6 of FIG. 1. One difficulty in decoding an aircraft Mode S address is that one may not be able to match every address to a unique aircraft identification number without having either a look-up table or conversion algorithm.

For example, in some instances, an aircraft might be brand new and not in the present database or the look-up table might not be available from a particular country of origin. It should be noted that unidentifiable registrations for these reasons are expected to be the minority of aircraft. However, for reasons such as noise monitoring, it may still be important to identify all or as many aircraft as possible.

Figure 4:
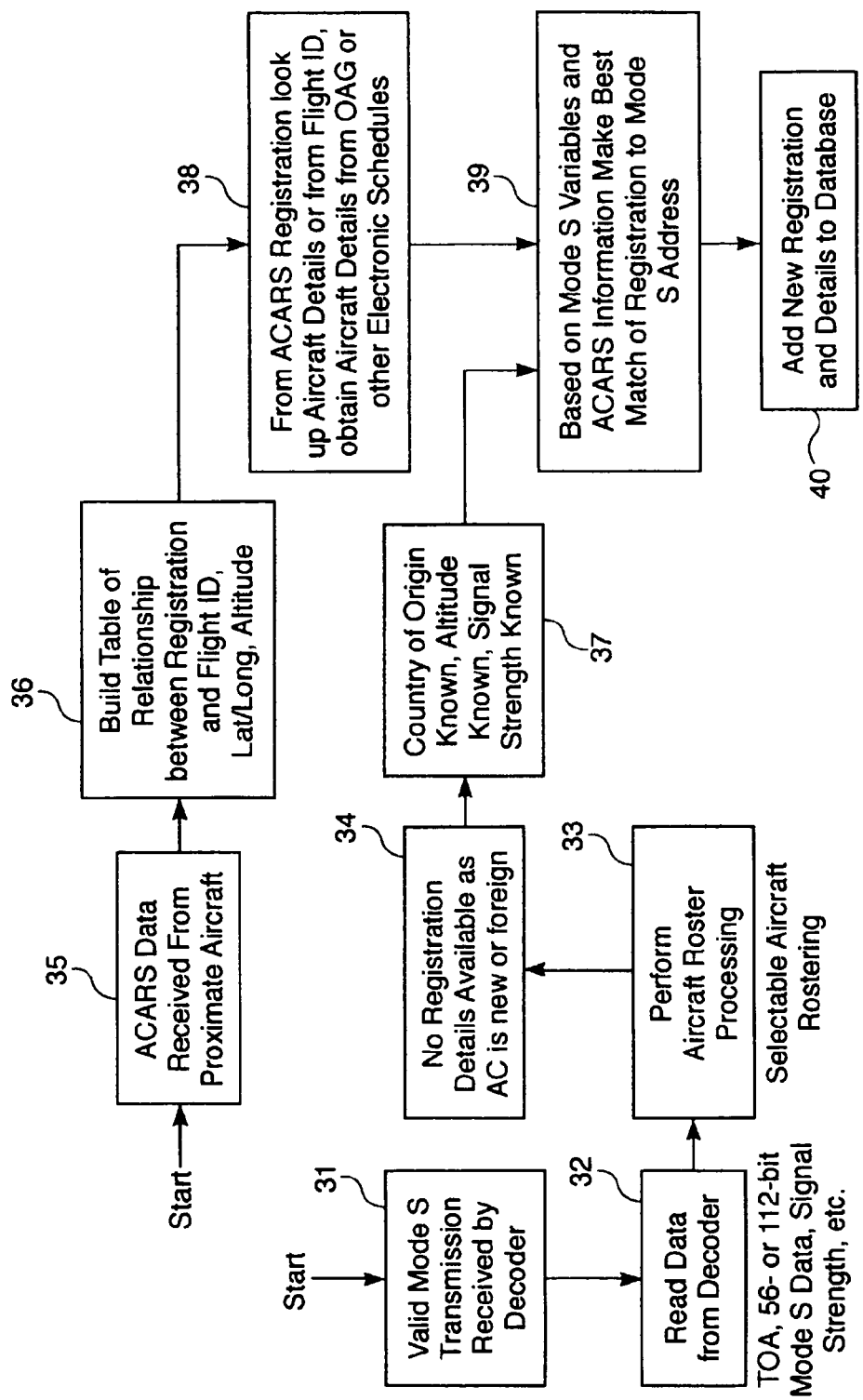
FIG. 4 is a block diagram illustrating the self-learning database system of the preferred embodiment of the present invention.

For this reason it is advantageous to have a database of aircraft Mode S addresses and registrations which may be updated regularly, such as in a preferred embodiment illustrated in FIG. 4 for a self-learning database.

Referring to FIG. 4, a Mode S transmission may be received by a decoder in step 31, and may be read from the decoder in block 32. A roster or table may be built for the aircraft in general area 33. In the example of FIG. 4, because the aircraft may be of foreign registration, no registration look-up may be available as illustrated in step 34. However, the country of origin may be known as are other details provided by Mode S decoding process 37.

Meanwhile, an ACARS receiver receives and processes ACARS data in step 35 and a table may be built in step 36 matching flight number to registration, and other details, based solely upon the ACARS information. Also, details on a particular aircraft may be known from the registration number, by looking up in other commercially available databases, such as the OAG schedule in step 38.

Based on the spatial and other information, a best estimate may be made of the match between the aircraft Mode S address and a registration number in step 39. The new registration/mode S look-up may then be entered into the database 40 for future use.

Since many foreign aircraft may tend to visit the same airports or airspace more than once, (e.g., routine commercial flights), the data acquired using such a technique may be accessed the next time such an aircraft re-visits the airspace. In addition, the system of the present invention may be networked to other such systems over a wide area to share such "learned" data.

Note that this technique may also be used to validate or correct information that may be already in a database. Thus, over a period of time, database data may be corrected or upgraded. Again, such data may be accessed during subsequent visits of an aircraft to an airspace, or may be shared with other systems so as to update a database for an overall network.

ACARS data may be used to determine aircraft weight and identification. Using this information, along with flight track, aircraft thrust may be calculated accurately. From calculated aircraft thrust and flight track, the amount of noise that the aircraft produced may be accurately determined using any one of a number of noise calculation models.

Sample parts of an ACARS message used by the invention are illustrated in the Table below:

| MESSAGE | DESCRIPTION |
| --- | --- |
| C-GDSU AC0878 YYZ ZRH | Aircraft Registration C-CDSU, Flight number Air Canada 878, going from Toronto to Zurich |
| TTL PAX 149 | 149 total passengers on board |
| OA 51, OB 54, OC 44 | 51 in first class, 54 in business class, and 44 in steerage |
| FOB 44.8 | 44,800 kilograms of fuel on board |
| ZFW 108.3 | Zero fuel weight is 108,300 kilograms |
| TOW 152.6 | Actual take off weight is 152,600 kilograms |

For a more complete listing of ACARS messages refer to Flyn, E.,*Understanding ACARS, Third Edition*, Universal Radio Research, 1995, incorporated herein by reference.

Figure 5:
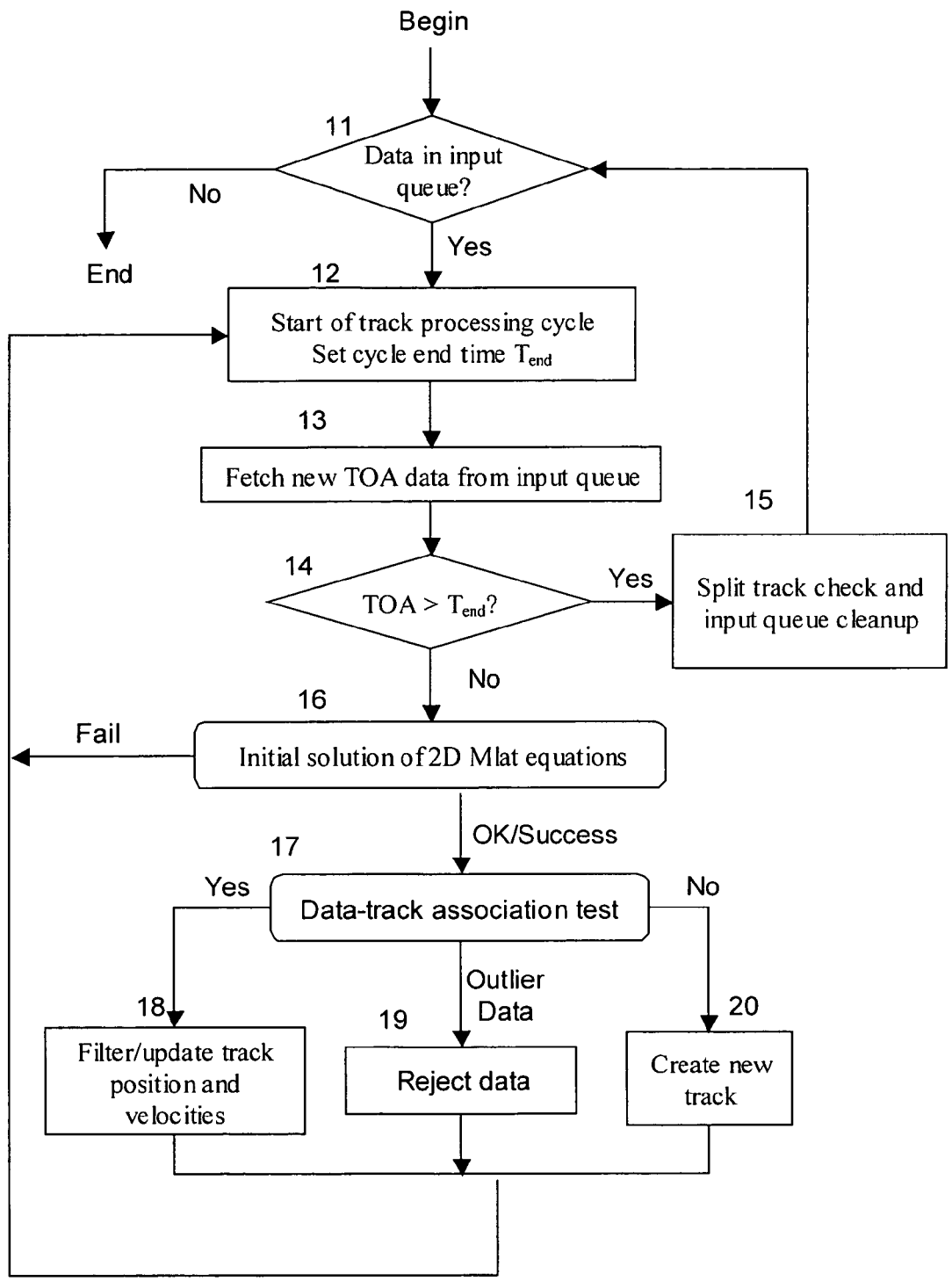
FIG. 5 is a block diagram of a multilateration tracking and filtering system of one embodiment of the present invention.

FIG. 5 is a block diagram of a multilateration tracking and filtering system of one embodiment of the present invention. In this embodiment of the present invention, a direct multilateration target tracking system is provided with time of arrival (TOA) as an input. For the purposes of this application, the term "track" is defined as a collection of records or data points which when connected together, represent the two or three dimensional flight path of an airplane, ground vehicle, or the like. A record may comprise a collection of track data. Each track record may carry some measures and a limited history of past positions generally associated with one airplane or ground vehicle.

The system of FIG. 5 still uses TDOA implicitly to compute positions and perform target tracking. As used in the present application, the term TOA means the clock value as stamped at the sensor when a signal is received from an aircraft. TDOA is derived from TOA as input. In the embodiment of FIG. 5, measurement errors in TOA may be directly incorporated into a standalone target tracking system. In comparison, a radar-centric target tracking system usually employs data fusion of radar data and multilateration equation solutions as input and requires the multilateration system to supply raw position calculated from the multilateration equation and to supply estimated position errors for the tracking system to work. As an example of a radar-centric data fusion algorithm, refer to the paper—J. G. Herrero, J. A. B. Portas, F. J. J. Rodriguez, J. R. C. Corredera, "ASDE and Multilateration Mode-S Data Fusion for Location and Identification on Airport Surface," (*IEEE 1999 Radar Conference Proceedings*, pp. 315–320, Apr. 20–22, 1999), incorporated herein by reference.

Because the estimated position error from the multilateration equation is really derived from TOA measurement error, this extra step may not only be unnecessary but may also serve to introduce more uncertainties. In essence, a standalone target tracking system with the knowledge of direct measurement error should perform better than a system in which some measurement errors are derived quantities.

In the embodiment of FIG. 5, the system may comprise, for example, a standalone two-dimensional (2D) target tracking system using an extended Kalman Filter technique. The state variables in the model are target x-y positions and velocities. The filter model is based on linearized statistical target dynamics state equations and statistical measurement equations. Depending on the type of target movement, the dynamics state equations may be in one of the two forms: one optimized for linear constant-speed motion, and the other optimized for targets under longitudinal or lateral accelerations. The measurement equations are defined by time-difference of arrival (TDOA) equations, with random noise characterizing the error in TOA measurements.

Referring to FIG. 5, the first processing step 11 is a decision block in which it is determined whether tracking data is present in the input queue. If data is present, processing proceeds to step 12. Otherwise, the process ends. Step 12 is the start of the track processing cycle, which includes setting a cycle end time $T_{end}$. $T_{end}$ is a preset cutoff time at the central server to release the batch of queued input data to the tracking module for processing. For example system may be set up to release the data at roughly three second intervals.

In step 13, new TOA (time of arrival) data is fetched from the input queue. The new TOA data from step 13 is compared with the $T_{end}$ value in step 14. If the TOA value is later than the $T_{end}$ value, then processing passes to step 15, where a split track check is performed and the input queue cleaned up. As used in the present application, the term "split track" refers to a situation where raw data may be processed by the system in such a manner that a single airplane track is split into multiple tracks, creating a condition known as "track pairing", where multiple tracks are created for the same aircraft. One object of the present invention is to combine such split tracks into a single airplane track having improved accuracy.

Figure 10:
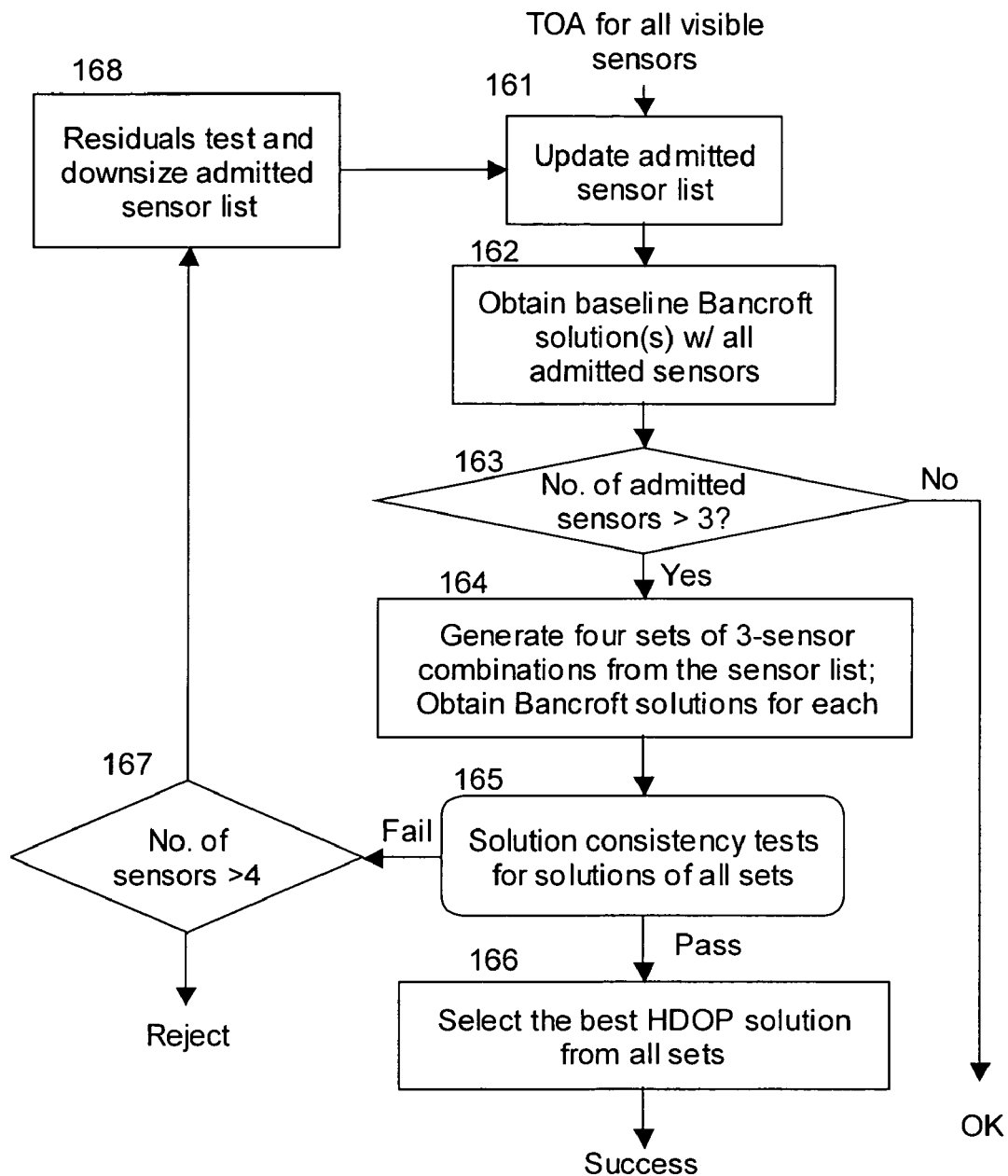
FIG. 10 is a block diagram illustrating the steps taken in generating initial solutions of the 2D Mlat equations.

In step 16, initial solutions of 2D Mlat equations are determined from the track data. If the initial solutions for the 2D Mlat equations fail, processing returns to step 12. These initial solutions define a track for an aircraft from individual data points. FIG. 10 is a block diagram illustrating the steps taken in generating initial solutions of the 2D Mlat equations. The following is a definition of terms as used in FIG. 10 and as applied to the present invention.

A 2-D Mlat Solution may be defined as follows. The basic multilateration ranging equation may be written as:

$$\sqrt{(x-x_i)^2+(y-y_i)^2+(z-z_i)^2}=c \cdot (t_i-t)$$

where $(x_i, y_i, z_i, t_i)$ represent local Cartesian coordinate and time of arrival at sensor number i. The vector (x, y, z, t) contains the target coordinate and the time of emission. For 2-D tracking, set the target z-coordinate using the reported altitude in the Mode C or Mode S message if applicable. For Mode A messages and Mode S messages without altitude report, a nominal z-coordinate is assumed. A minimum of three sensors is needed for solving the remaining unknowns (x,y,t).

H(V)DOP represents Horizontal (or Vertical) dilution of precision. DOP (Dilution of precision) is a measure of solution error bound in a multilateration system. HDOP is the approximate ratio of root-mean-squares (RMS) error in the horizontal plane (x and y) to the root-mean-squares error of "pseudorange". Both HDOP and VDOP are dependent upon the geographical placements of sensors.

Pseudorange is equal to the product of the speed of radio wave and the measured travel time between the sensor and the target. The pseudorange error is proportional to clock (timing) error at the sensor.

The Best HDOP solution is defined when there are more than three sensors in the received TOA messages. 2D Mlat-equations from different 3-sensor combination usually give rise to different (x,y,t) solution and different HDOP. "Best" HDOP solution refers to the one with the lowest value of HDOP among the 3-sensor subsets considered.

Bancroft Solution refers to the direct solution technique of multilateration equation derived by Stephen Bancroft. See, e.g., S. Bancroft, "An Algebraic Solution of the GPS Equations," *IEEE Transactions on. Aerospace and Electronics Systems*, Vol.AES-21, No. 7, pp. 56–59, January 1985, incorporated herein by reference.

Referring again to FIG. 10, in step 161, TOA (time stamp) data for all visible sensors is input. The term "visible" sensors, as used herein refers to sensors which receive the transponder signal from an aircraft. In step 161, the admitted sensor list is updated based upon the input TOA data.

Figure 11:
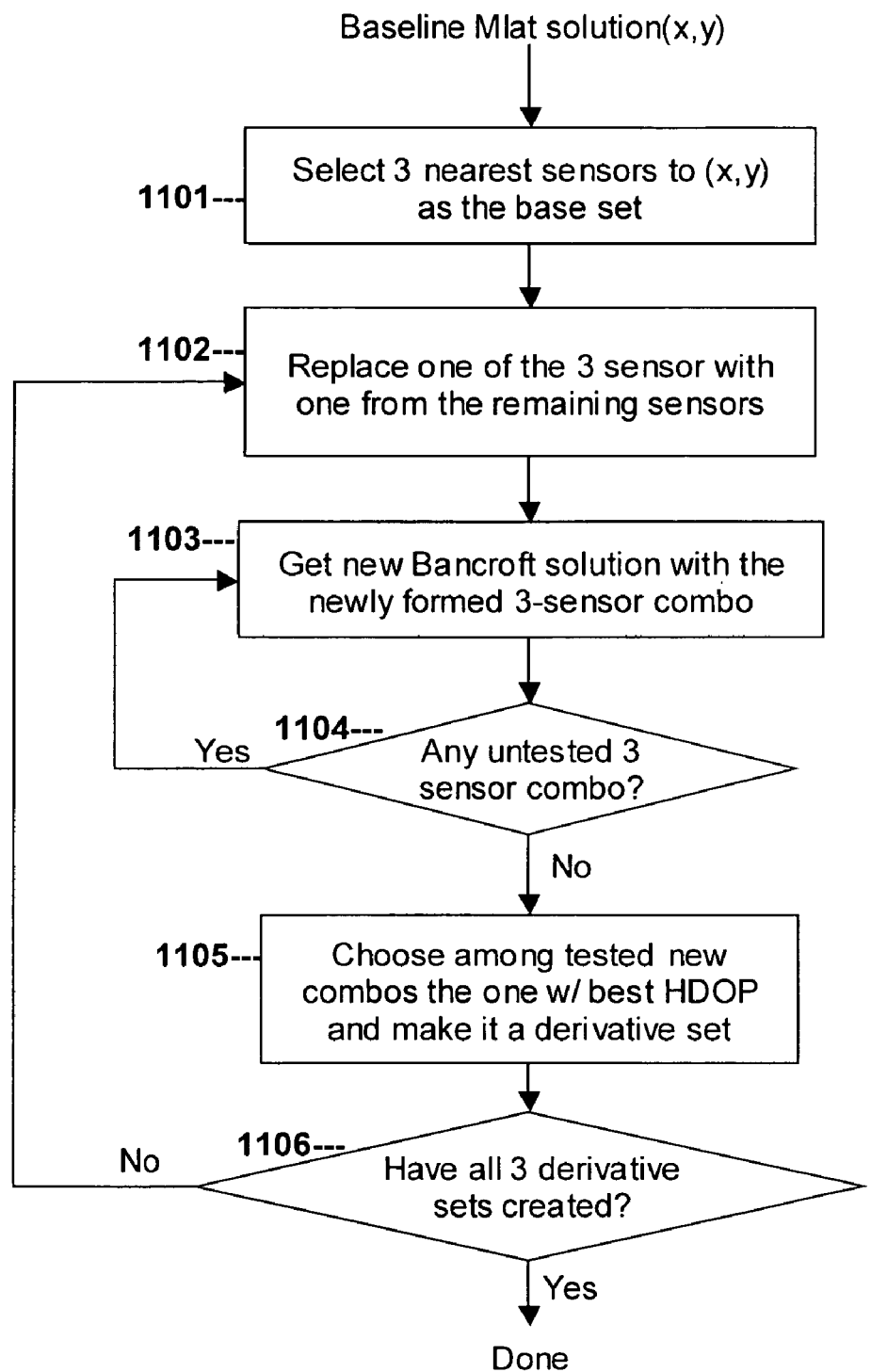
FIG. 11 is a block diagram illustrating the steps taken in step 164 of FIG. 10.

In step 162, baseline Bancroft solutions are obtained for all admitted sensors. If the number of sensors is equal to or less than three, as determined in step 163, processing terminates. If more than three sensors are present, processing passes to step 164. In step 164, four sets of three-sensor combinations are generated from the sensor list. Note that in some circumstances it may be desirable to generate more than four sets of three-sensor combinations randomly in order to allow maximum flexibility in selecting the best solution. Bancroft solutions are obtained for each combination of three sensors. FIG. 11 is a block diagram illustrating the steps taken in step 164 of FIG. 10.

Referring to FIG. 11, a baseline Mlat solution is input into step 1101, where the three nearest sensors to the (x,y) position are used as base set. In step 1102, data from one of the three sensors selected in step 1101 is replaced with data from one of the remaining sensors and a new Bancroft solution is obtained from the new three sensor combination in step 1103.

In step 1104 a determination is made as to whether any other combination of sensors has not yet been tested. If so, processing passes back to step 1103 and new Bancroft solutions obtained for other combinations. If no, processing passes to step 1105 where from among the sensor combinations tested, the one with the best HDOP is selected and made a derivative set. If all three derivative sets have been created, processing is completed. If not, processing passes back to step 1102 and the process completed until all three derivative sets are created.

Referring back to FIG. 10, in step 165, the consistency of the solutions for all sets is tested. Consistency, as used herein, means that at least one solution (if not unique) calculated from each sensor combination is close to the others. In other words, a clear cluster is formed from one solution from each set. If the solutions are consistent, the best HDOP solution is obtained from all the sets in step 166 and processing is completed, whereupon the process proceeds to step 17 in FIG. 5. If the solutions are inconsistent as determined in step 165, processing passes to step 167. In step 167 if the number of sensors is greater than four, processing passes to step 168, where a residuals test is performed and the number of sensors in the admitted sensor list is downsized. Processing passes back to step 161 and the process repeated. On the other hand, if the number of sensors is already four, as determined in step 167, the process is terminated and the solutions rejected, and processing passes back to step 12 in FIG. 5.

Referring back to FIG. 5, in step 17, a Data-track association test is performed to determine whether the data is associated with an existing target track, should be a new track, or should be rejected. If the data is associated with an existing track, the existing track position and velocities are filtered and updated with the latest record data in step 18, and processing returns to step 13. If the data is not associated with an existing track, a new track is created in step 20, and processing returned to step 13.

If the outlier data is present, the data is rejected in step 19 and the process passes to back to step 12. The term "outlier data" as used in the present application refers to a set of TOA data which is determined by the tracking system to be associated with an existing track but is suspected to suffer from some inconsistencies, and would thus not be used to update the track record.

Figure 12:
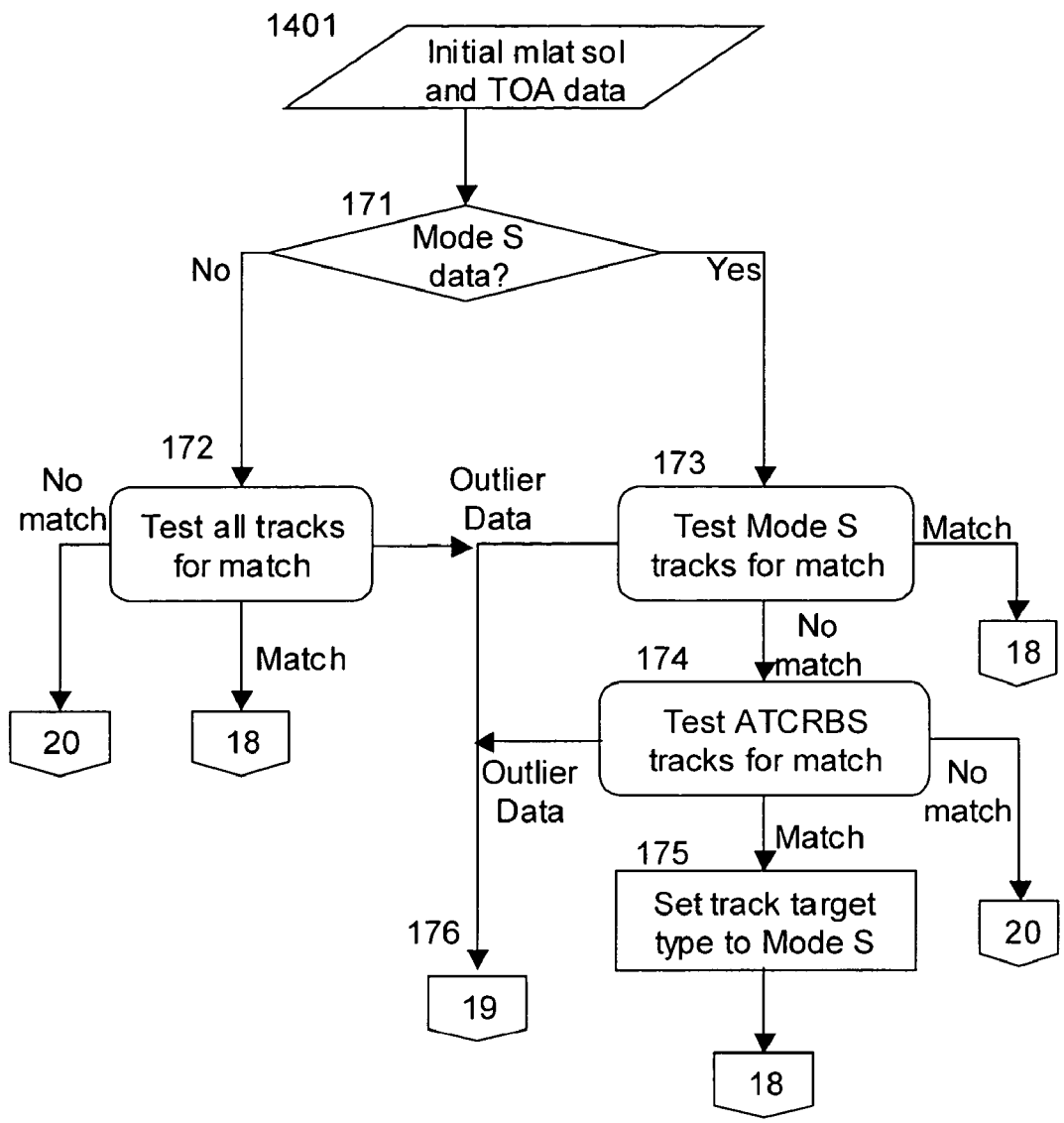
FIG. 12 is a block diagram illustrating the steps taken in step 17 of FIG. 5.
Figure 13:
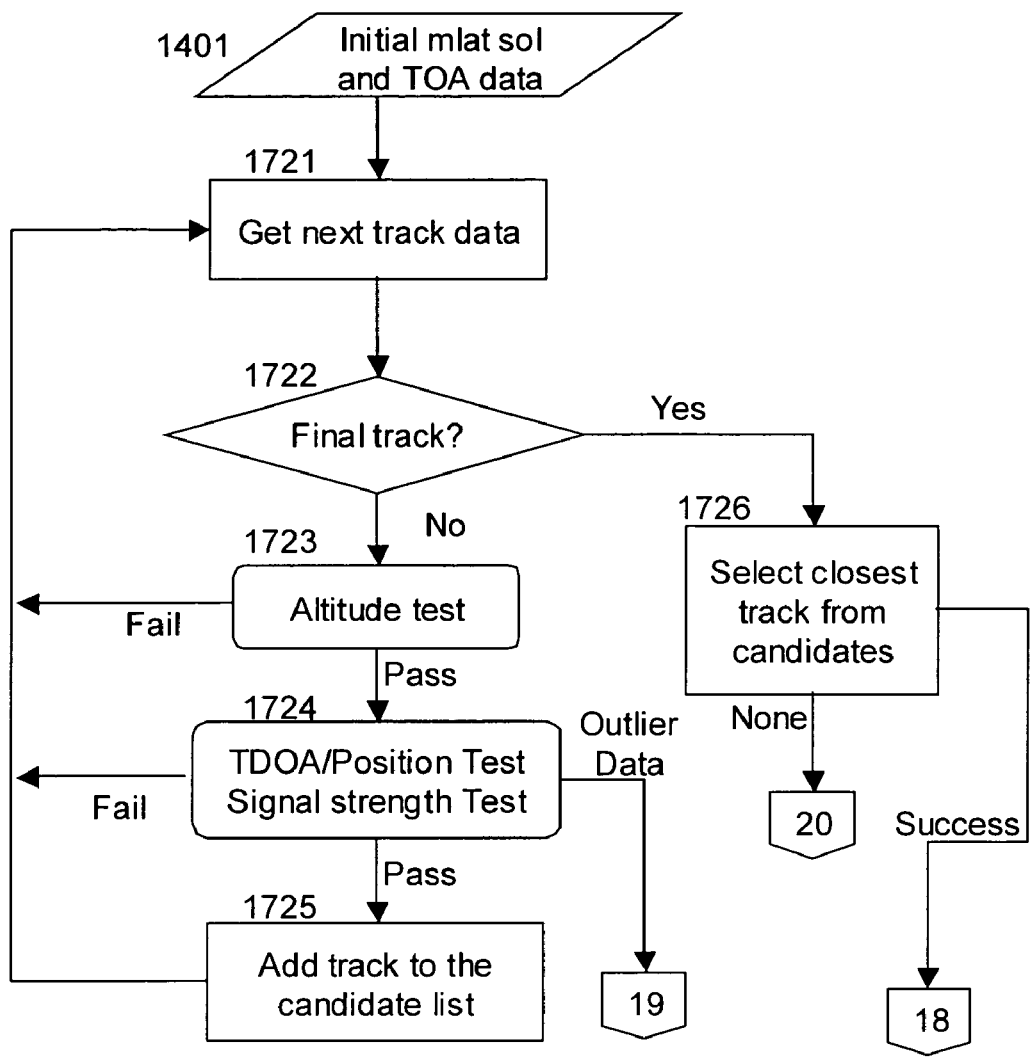
FIG. 13 is a block diagram illustrating the steps taken in step 172 of FIG. 12.

FIG. 12 is a block diagram illustrating the steps taken in step 17 of FIG. 5. In step 171, the initial Mlat solution (from block 16 of FIG. 5) and TOA data (from block 13 of FIG. 5) 1401 is input and checked to see if it is Mode S data. If not TOA data are from ATCRBS messages but can come from a Mode S target, thus all tracks are tested for a match in step 171. If there is no match, processing passes to step 20 in FIG. 5. If a match exists, processing passes to step 18 in FIG. 5. In the event of Outlier Data, processing passes to step 19 of FIG. 5. FIG. 13 is a block diagram illustrating the steps taken in step 172 of FIG. 12. FIG. 13 is essentially an execution loop in which track data are retrieved from memory and compared against TOA data and associated Mlat solution (from blocks 13 and 16 of FIG. 5). A sequence of tests including Altitude test (block 1723) and composite TDOA/Position/Signal Strength test (block 1724) are conducted.

The objective of these tests is to determine the likelihood a particular track matches the input TOA data and the associated Mlat solution. When the test results exhibit a high probability of a match, step 1725 is executed wherein the track is added to the "candidate list" together with a record of the "distance measure" between the track data and the input solution data. After all the potential track data have been tested, the distance measures of all candidate tracks are compared in block 1726 to facilitate selection of the "closest" track to match the input data. The final candidate track data, together with the input data, are sent to Step 18 in FIG. 5 for final processing. If no candidate tracks are found, the input data is sent back to Step 20 in FIG. 5 for creating a new track.

It should be noted that in many cases, however, the process of matching input data with the track memory can conclude without further delay if certain criteria are met to indicate 100% match probability, essentially bypassing step 1726. These 100% match circumstances could also accompany some data anomaly wherein the Mlat solution falls outside a "sanity window" established by the dynamics of the track data, the input TOA data is labeled "outlier data" and the execution is immediately passed back to step 19 in FIG. 5.

On the other hand if the input TOA data comes from a mode S message, at step 171, the processing passes to block 173 where mode S tracks are tested for a match. This loop examines all track records which have been tagged as Mode S targets. There are two criteria in which the processing exits the loop:

(1) When all track records have been checked and none has the same 24-bit Mode S address as the TOA input data, then processing passes to block 174 of FIG. 12. The details of block 174 of FIG. 12 are essentially the same as in FIG. 13, with the exception that Mode S track are skipped since they have already been checked for match in the previous step. When the input data is found to match an existing ACRBS track, the track will be re-tagged in Step 175 as a Mode S target and given the Mode S address contained in the input data, and the execution passes to Step 18 in FIG. 5. If there is still no match, the execution goes to Step 20 and a new Mode S track will be created. If the input data is considered to be an outlier, the execution goes back to Step 19.

(2) If the Mode S address of one track matches that of the input data, then a match is immediately declared. The execution continues on to Step 1735, the TDOA/position tests to determine if the input date constitutes an outlier. If the test fails the data is considered to be an outlier and the execution goes to step 19; otherwise it continues to step 19 in FIG. 5.

Figure 14:
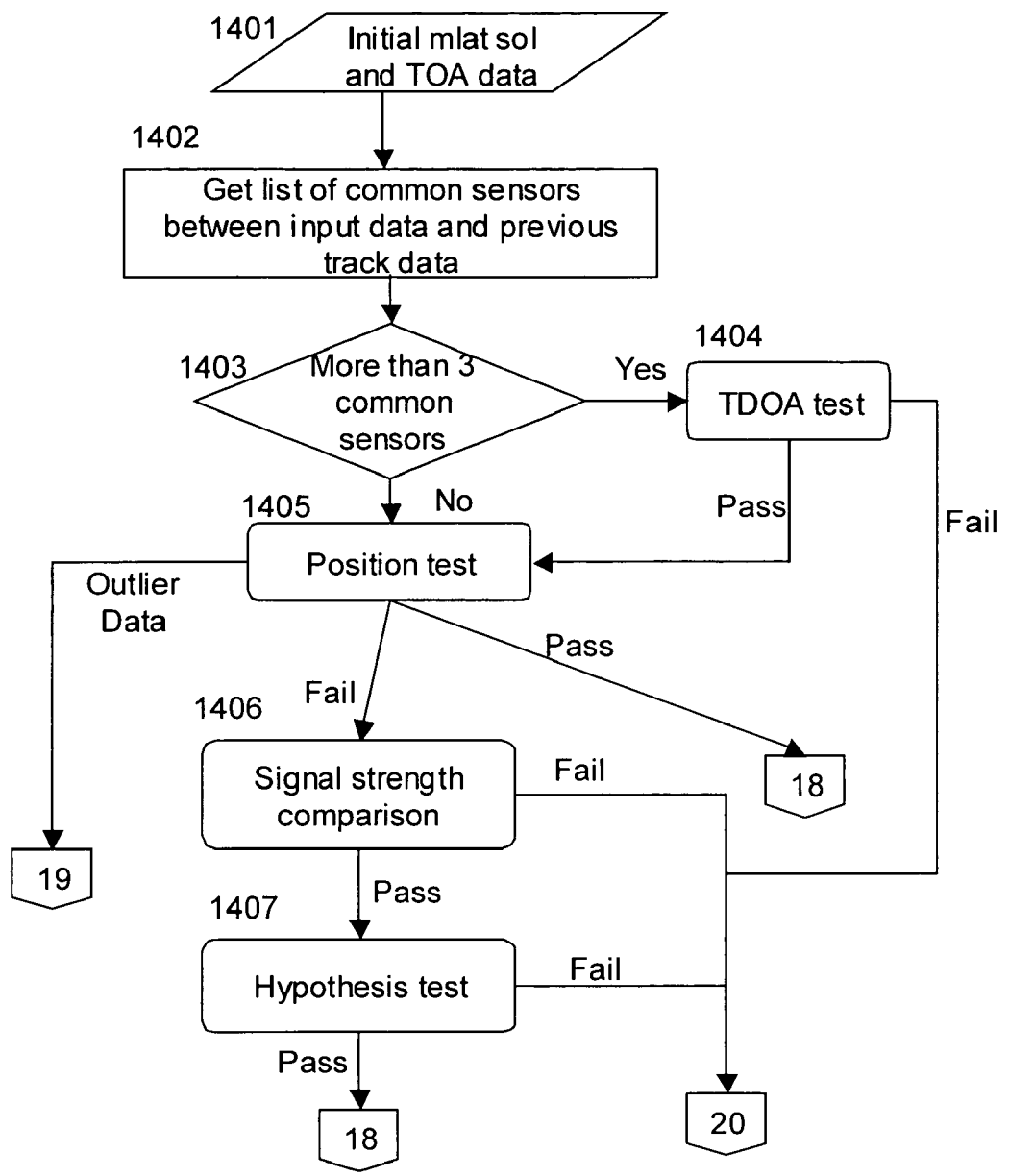
FIG. 14 is a block diagram illustrating the steps taken in step 1724 of FIG. 13.
Figure 15:
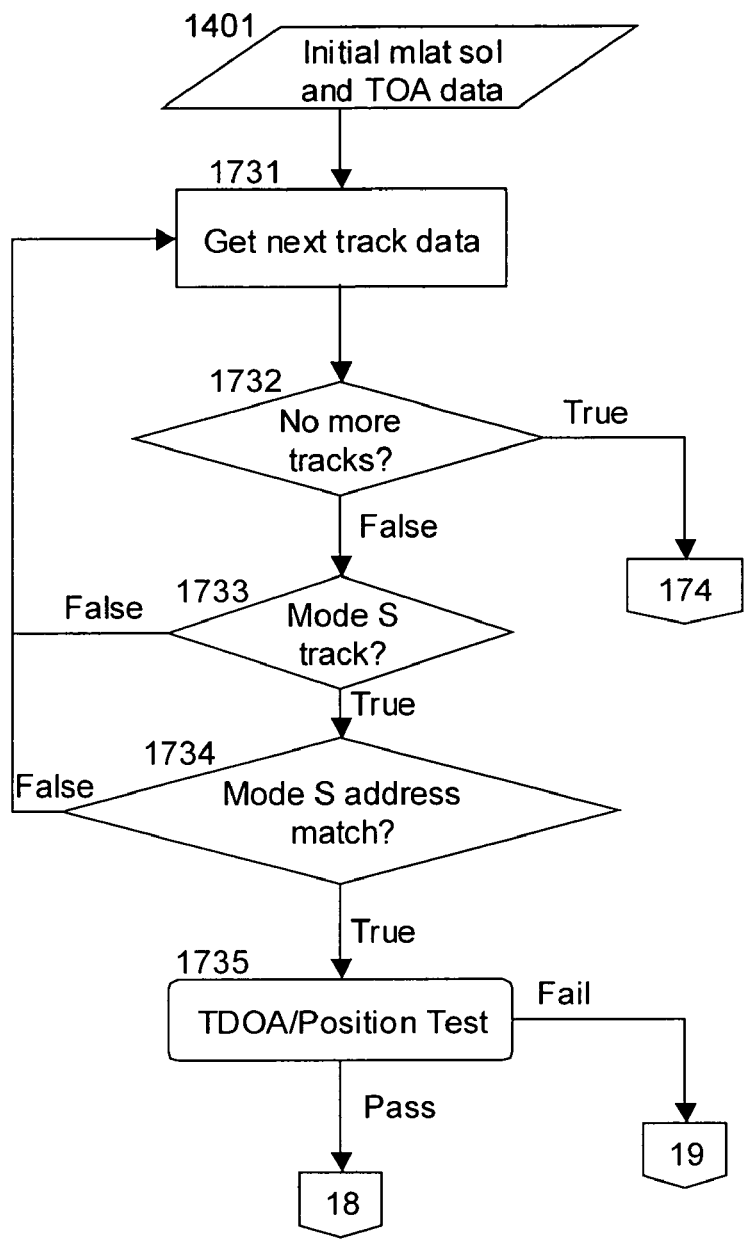
FIG. 15 is a block diagram illustrating the steps taken in step 173 of FIG. 12.

The overall procedure for TDOA/Position test and signal strength test is illustrated in FIG. 14. The block diagram here represents the steps taken in step 1724 of FIG. 13. The steps taken in step 1735 in FIG. 15 for Mode S track match are essentially the same, with tow exceptions:

(1) Block 1406 "Signal Strength Comparison" is bypassed entirely.

(2) Where the outcomes of the test leads to Step 20 should be directed instead to Step 19.

In step 1401, the next track data is retrieved from initial Mlat solution (from block 16 of FIG. 5) and OA data (from block 13 of FIG. 5). In step 1402, a list is obtained of common sensors between input data and previous track data. This list comprises all of the sensors (i.e., multilateration receivers) used in obtaining both the input data and the previous track data.

In step 1403, a determination is made to see if more than 2 sensors are in common. If yes, a TDOA test is performed in step 1404. The TDOA test basically checks to see if the TDOA between a pair of sensors varies within a certain range between consecutive data updates, as dictated by target dynamics. If the TDOA test passes the input data and the track data are likely to be from the same aircraft, and processing passes to step 1405. If the TDOA test fails, the aircraft tracks are deemed not related, and processing passes back to step 20 in FIG. 5, or when executing within the context of Step 1735, Step 19 in FIG. 5.

In step 1405, a position test is performed to determine whether the position given by the initial Mlat solution is within a "sanity window" of possible track movement based on the predicted target dynamics. If the position test passes, processing passes to step 18 of FIG. 5. If outlier data is present, processing passes to step 19 of FIG. 5. If the position test fails, a signal strength comparison test is performed in step 1406. In this test, the relative signal strength of received signals is compared. If they are not within a certain tolerance, processing passes to step 20 in FIG. 5. If they are substantially the same strength, processing passes to step 1407 where a hypothesis test is performed.

Hypothesis testing may be used to assist in the correlation of two ATCRBS messages of different codes or an ATCRBS and a Mode S message, and the combination of them into a single target track. Hypothesis testing in a multilateration system refers to a process of comparing two sets of message data in which new raw multilateration solution position is calculated for one set by assuming the altitude to be the same as the other set. The set that changes altitude must not contain a Mode S message. The new raw solution is then fed into positional metric to determine whether the two sets of message data belong to the same target.

If the hypothesis test 1407 fails, processing passes to step 20 of FIG. 5. If the hypothesis test 1407 passes, processing passes to step 18 of FIG. 5.

Figure 6:
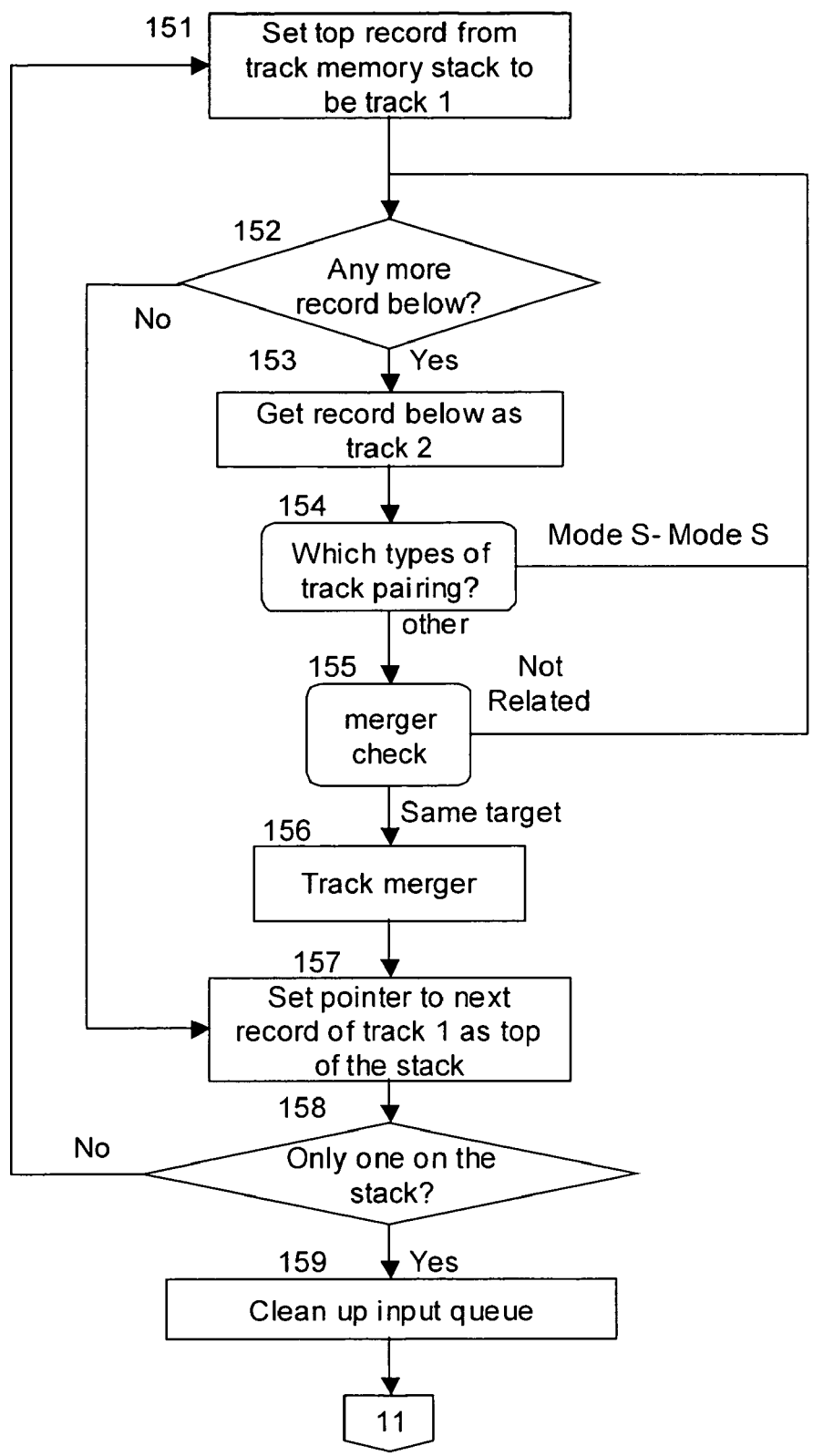
FIG. 6 is a block diagram illustrating the steps in the split track check in step 15 of FIG. 5.

FIG. 6 is a block diagram illustrating the steps in the split track check in step 15 of FIG. 5. In step 151, a top record from the track memory stack is set to be track 1. In step 152, a determination is made whether any more tracks are present. If so, the next record below is retrieved in step 153.

In step 154, a determination is made as to which types of track pairing is occurring. The term "track pairing" as used in the present application, refers to a technique to determine whether two distinct track records are really associated with the same airplane (or ground vehicle), or represents two separate vehicle paths. During initial data processing, it may not be readily apparent that some raw data is coming from the same airplane. If track pairing checks are not performed, the system may report the same airplane track twice on a visual display or the like, causing confusion and also making the display difficult to read.

The system generates tracks from multilaterated transponder data. Transponder data may be from an aircraft equipped with the newer Mode S transponder, or the older ATCRBS (Air Traffic Control Radar Beacon System) transponder. The present invention captures at least three types of transponder messages:

(1) Mode A (Mode 3 in military aircraft)—containing only 12-bit identity (squawk code or beacon code) data;

(2). Mode C—containing only altitude data in a 12-bit code; and (3) Mode S—which may have identity only, altitude only, or both, and in either case, a unique 24-bit Mode S address.

A Mode S transponder may reply all three types of messages or interrogations, but an ATCRBS transponder may reply in only the first two formats (Mode A and Mode C). As noted above, various aircraft are equipped with different transponders. Thus, depending upon which type of system is interrogating a Mode-S transponder, an aircraft may generate a Mode-S response or Mode-A or Mode-C response. A resultant aircraft track may thus be made up of different types of multilaterated signals. Thus, the present invention receives transponder signals from all three types (Mode A, Mode C, and Mode S).

In addition, aircraft equipped with TCAS (traffic collision avoidance system) may also interrogate other aircraft for Mode C messages, and Mode S transponders may generate "squitters" at semi-random intervals. Most of the time, the system is able to correlate different messages from the same airplane to a single track. For example, some Mode S messages also contain identification (squawk code), and once they are captured we will be able to correlate Mode A messages of the same code to this track. However, in the present invention, a "split track check" is provided to capture the other, more difficult situations, where data correlation is not so simple.

For the purposes of the present application, the term "ATCRBS track" refers to any track which is initiated and updated only with type Mode A or Mode C messages. The term "Mode S track" refers to a track which is either initiated or subsequently updated with at least one Mode S message. However, this does not mean ATCRBS track cannot be associated with a Mode S transponder, because the tracking system may initially receive only the Mode A or Mode C messages from such a transponder. This condition is checked in the "split track check" cycle 15 in FIG. 5.

The reason that "track pairing", or "split track check" is needed is because, unlike an air traffic control radar system, which initiates target interrogation and knows what message to look for, the passive system of the present invention sometimes cannot tell whether a message is Mode A or Mode C, as about ⅛ of the 12-bit code combinations are shared by both messages for aircraft flying under 50,000 feet above sea level, which is usually the case with civilian fleets. Sometimes, this leads to a track initiated on an incorrect altitude when the purported altitude may actually be translated to a squawk code.

Therefore it is not uncommon to see messages from a single airplane ending up in two tracks, one containing the true altitude, and the other containing the wrong altitude. For the same reason, sometimes the tracker fails to correlate the Mode A message to a Mode S transponder during the initial processing cycle, and therefore two tracks are established for one target-one Mode S track, and the other an ATCRBS track with the wrong altitude.

As illustrated in step 154 of FIG. 6, a Mode S-Mode S track pairing is not a possible outcome. A Mode-S track is uniquely identified by the airplane's mode-S address and the initial track processing would have property handled Mode-S data and not split the data across two distinct track records. Thus, if both tracks are from Mode-S data, processing returns to step 152 to immediately fetch the next track data for further comparison.

Figure 7:
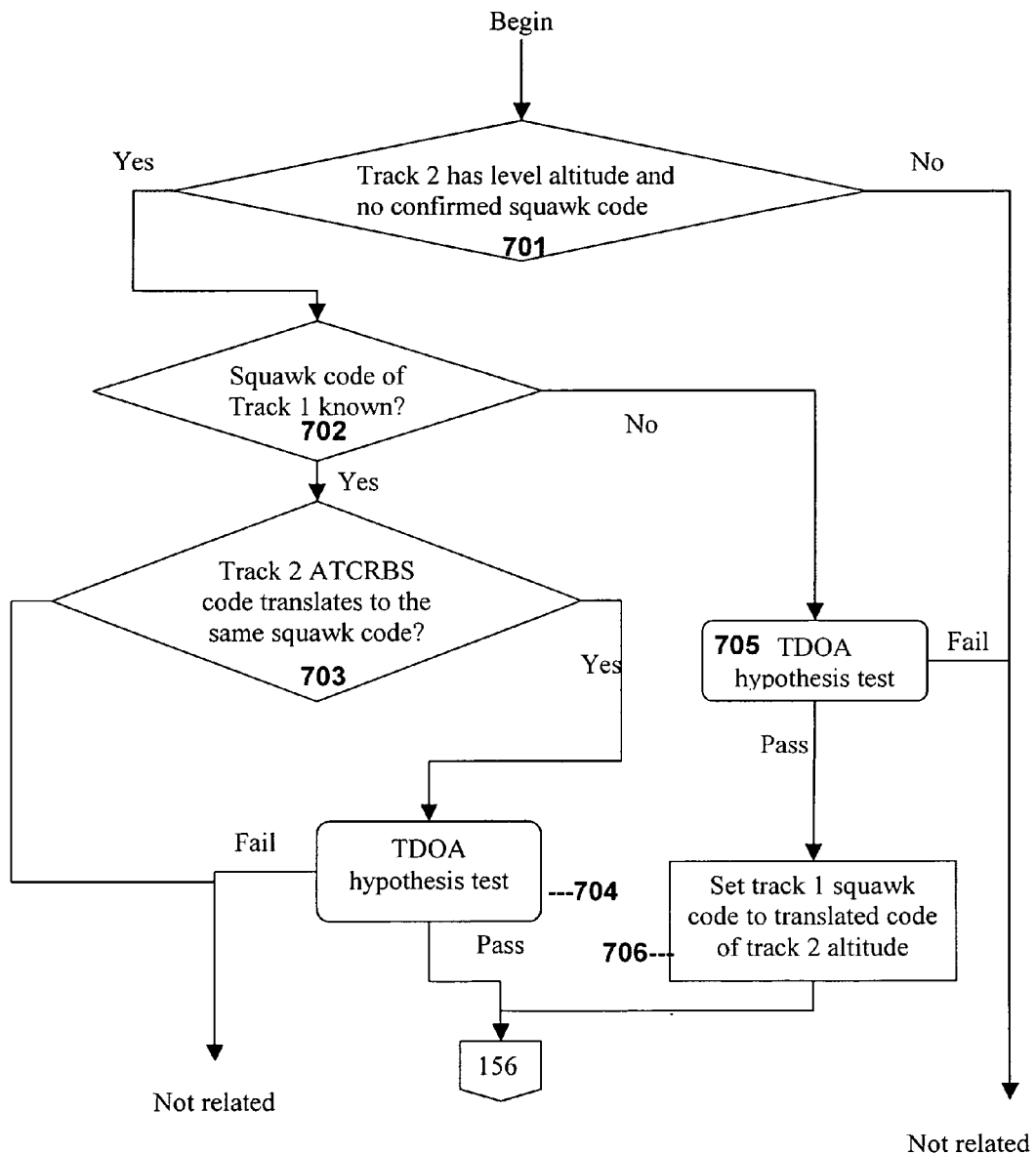
FIG. 7 is block diagram illustrating a first example of a merger check for Mode S-ATCRBS, assuming track 1 to be Mode S and track 2 to be ATCRBS.
Figure 8:
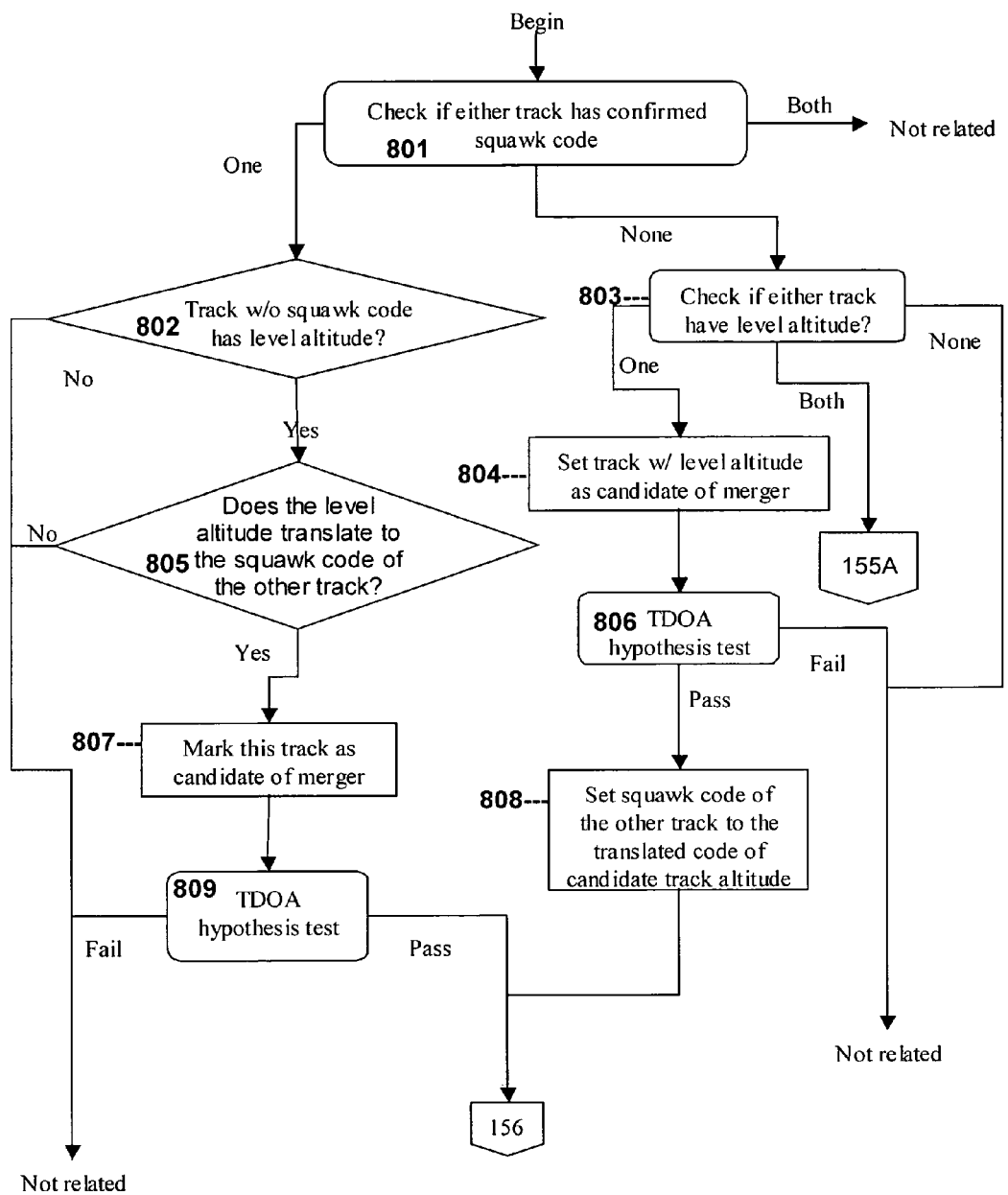
FIG. 8 is a block diagram illustrating a second example of a merger check when both tracks are ATCRBS.

As illustrated in step 154, if the two tracks use different data types (e.g., Mode-S and ATCRBS) a merger check is then performed in step 155 to determine whether they are in fact from the same aircraft. Examples of this merger check are illustrated in FIGS. 7 and 8. If the two tracks are not related (e.g., different aircraft) processing returns to step 152 to fetch the next track data for further comparison. If the tracks are related to the same aircraft, the two tracks may be merged in step 156.

In step 157 the pointer is set to the next record of track 1 as the top of the stack. If this is the only record in the stack, the input queue is cleaned up and processing returned to step 11 in FIG. 5. If there are other track records in the stack, processing returns to step 151 for further split track checking.

FIG. 7 is block diagram illustrating a first example of a merger check step 156 for a Mode S track and ATCRBS (Air Traffic Control Radar Beacon System) track, where two tracks are checked to see if they are actually data for the same aircraft or vehicle. In the example of FIG. 7, track 1 may comprise record data obtained from a Mode S transponder and track 2 from ATCRBS.

In step 701 a determination is made whether track 2 has a level altitude and no confirmed squawk code. As used in the present application, the term "level altitude" refers to the history of a single track, not two tracks. As used in the present application, "level altitude" means that the recorded altitude for a track did not change since its initiation.

Altitude data is taken directly from Mode C, or more precisely, "apparent Mode C"-messages. When a track keeps presenting the same "altitude" without ever acquiring a squawk code for a long time, there is possibility that this altitude is not the true altitude; rather it may be that the messages constructing the track should have initially have been taken as Mode A messages and translate the altitude to a valid squawk code.

In this instance, two tracks are compared, both of which appear to overlap horizontally (in 2-D) and both without a squawk code. If the first track has changes of recorded altitude since initiation and the second one has "level altitude", then chances are that the second track really just contains Mode A messages of the first track.

Thus, as illustrated in step 701, if both conditions are not present, it is presumed that the two tracks are not related and processing ends. If there is a confirmed squawk code, the data has likely already been correlated with the correct aircraft track. If the second track has a variable altitude then it may be assumed that this second track is not merely a mode A message version of the first track, but rather a different aircraft flying above or below the first track aircraft of interest.

If, however, track two has a level (unchanging) altitude, and no confirmed squawk code, processing passes to step 702 for further evaluation. In step 702 a determination is made as to whether the squawk code of the first track is known. If so, then the aircraft track may be identified and processing passes to step 703. If the squawk code of the second track is not known, processing will pass to step 705 for a TDOA hypothesis test.

In step 703, a determination is made as to whether the track 2 (ATCRBS track) code translates into the same squawk code as the track 1 (Mode-S) squawk code. If so, the two tracks are from the same aircraft, and should be combined. Processing then passes to TDOA hypothesis test step 704. If not, it is assumed that the two tracks are from different aircraft and a determination is made that the signals are not related.

Steps 705 and 704 describe the same TDOA (or DTOA, the terms are interchangeable for the purposes of the present application) hypothesis test function. In this step, a time difference of arrival (TDOA or DTOA) technique is employed to determine the position from which the transponder signal was transmitted. Various TDOA (DTOA) and multilateration techniques are described in the Patents and co-pending applications cited above and incorporated by reference.

By measuring the difference in arrival times of a transponder signal at various receiving stations having known positions, it is possible to calculate, with some accuracy, the exact position of the vehicle generating the radio signals. The DTOA hypothesis test calculates a position for each track data. If the positions of the two track data are within a predetermined parameter, it may be decided that the two tracks are in fact for one aircraft. Note that various multilateration and triangulation techniques may be employed in this step. The process is not limited to that of the techniques described in the related applications and cited Patents incorporated by reference.

In step 704, if the TDOA hypothesis test passes (i.e., the two tracks are determined to be from the same aircraft) processing passes back to step 156. If the TDOA test fails, the aircraft tracks are not deemed to be related. In step 705, a similar process takes place. However, if the TDOA hypothesis passes (i.e., the two tracks represent the same aircraft) processing first passes to step 706 to set the squawk code for track 1 to a translated code for the track 2 altitude. In this manner, subsequent split track data will be correlated property for the subject aircraft in subsequent applications of step 703.

It would occur to one of ordinary skill in the art that the TDOA (or DTOA) hypothesis test could be used for all track split operations, rather than applying the earlier steps illustrated in FIG. 7. While such a technique is possible, and within the scope of the present invention, by first comparing squawk codes, the track data may be more quickly compared and moreover a more accurate comparison made. Performing the TDOA hypothesis test for each split track may require additional processing and slow down the system. Moreover, the TDOA hypothesis test may not always produce consistent results.

FIG. 8 is a block diagram illustrating a second example of a merger check when both tracks are ATCRBS (i.e., Mode A and/or mode C). Thus, for example, in this case both tracks may be from data generated by Mode-C and Mode-A transponder data formats. In step 801 a check is made to determine whether either track has a confirmed squawk code. If both have confirmed squawk codes, then the tracks are not related, as data for two tracks having the same confirmed squawk codes would already have been joined earlier.

If only one track has a confirmed squawk code, a determination is made in step 802 as to whether the track without the confirmed squawk code has a level altitude. As noted above, a level altitude may indicate that the track data is merely a Mode A version of the other track. If the altitude of the track in question is not level, it is assumed to be a different track and the two tracks are considered "not related".

If, however, the altitude is level, a determination is made in step 804 as to whether the level altitude data is actually a squawk code which is the same as the other track. If not, it is assumed the two tracks are not related. If so, processing passes to step 807, where the track is marked as a "candidate" for merger with the other track. In step 809, the TDOA hypothesis test is performed to confirm whether the two tracks are the same. If so, the tracks are merged and processing passes to step 156.

From step 801, if neither track has a confirmed squawk code, processing passes to step 803. In step 803, a determination is made to see whether either track has a level altitude—a possible indication of misinterpreted Mode A data. If not, the two tracks are presumed to be unrelated. If both have a level altitude, processing passes to step 155A in FIG. 9, which will be discussed in more detail below.

If only one track has a level altitude, that track may be set as a candidate for merger in step 804 and a TDOA hypothesis test performed in step 806. If the TDOA hypothesis tests shows the two tracks to be the same aircraft, the squawk code of the other track is set to the translated code of the candidate track "altitude" (the altitude actually being a misinterpreted Mode-A squawk code) and processing passes to step 156.

Figure 9:
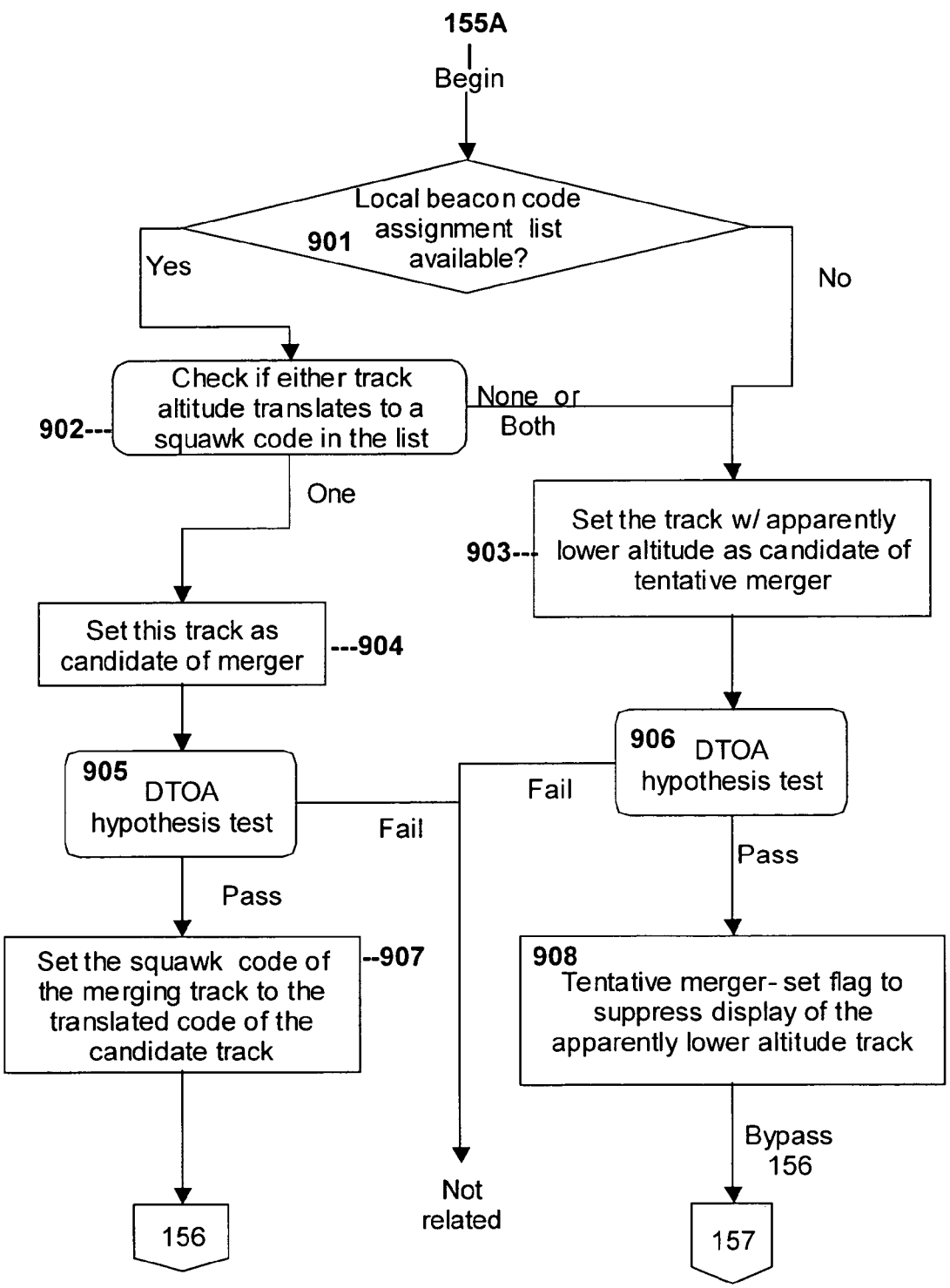
FIG. 9 is a block diagram illustrating a variation of the example of FIG. 8, where two ATCRBS tracks both have level altitudes and neither has a confirmed squawk code.

FIG. 9 is a block diagram illustrating a variation of the example of FIG. 8, where two ATCRBS tracks both have level altitudes and neither has a confirmed squawk code. The process begins at step 155A, which represents the transfer point from FIG. 8. In step 901, a determination is made as to whether a local beacon code assignment list is available. Such a list would correlate Mode-A or Mode-C beacon data into a squawk code.

If such a list is available, a check is made in step 902 to determine whether either track "altitude" reading translates into a squawk code from the local list. If only one track has an "altitude" reading that translates into a squawk code on the list, processing passes to step 904. If neither track translates, or both translate to a squawk code on the list, processing passes to step 903, which will be described in more detail below.

In step 904, the track whose "altitude" (which is likely a misinterpreted Mode-A reading) corresponds to a squawk code on the local beacon code assignment list is set as a candidate for track merging. In step 905, the DTOA (TDOA) hypothesis test is performed. If the two tracks are similar, the squawk code of the merging track is set to the translated code of the candidate track and processing passes to step 156 of FIG. 7.

In step 902, if none or both of the tracks has a "altitude" reading that translates into a squawk code from the local beacon code assignment list, a track with an apparently "lower" altitude reading is set as a candidate for merger. Again, in step 906, the DTOA (TDOA) hypothesis test is performed. If the two tracks appear to be similar, a tentative track merger is determined. A flag may be set to suppress display of the apparently lower altitude track, and processing passed to step 157.

It is readily apparent that the first embodiment of the target tracking system described generally in FIG. 5 is unique in that the statistical property of TOA is directly incorporated into the filtering equation, thus generally resulting in better accuracy. This approach is in contrast with radar-centric target tracking systems, which may employ data fusion of radar data and unfiltered multilateration equation solutions as inputs. One problem with radar-centric data fusion is that the inherent statistical properties of primary radar measurement differ very much from those of multilateration equation solutions.

Figure 16:
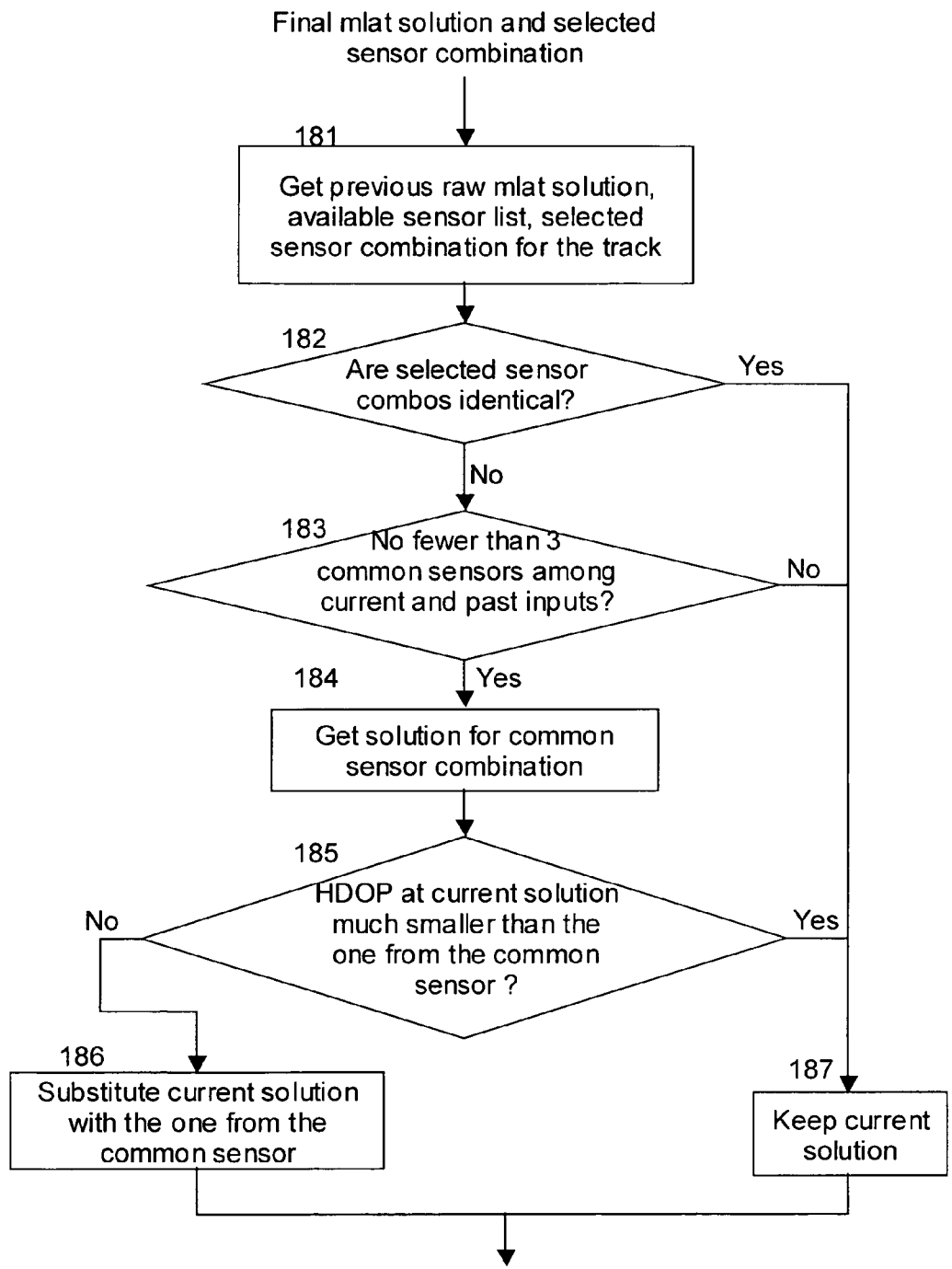
FIG. 16 is a block diagram illustrating the steps taken in step 18 of FIG. 5

In the second embodiment of the present invention, as described above in connection with FIG. 16, a technique is provided for tracking targets with varying receiver combinations. In a multilateration target tracking system, not all sensors are able to supply a TOA value for every single reply message of any target. Because of geographical placement of sensors and the statistic nature of TOA measurement noise, these diverse sets of sensor TOA combinations yield raw multilateration equation solutions which may spread all over the place, even from one message to the next.

In this second embodiment, of the present invention, a program memory is set up to record the sensor combination used in the previous track update process. A set of rules has been developed to determine the optimal sensor combination for the measurement equation in the extended Kalman Filter model. The first choice is to go with the same sensor combination as the previous measurement. Doing so improves track accuracy and smoothness. If the same sensor combination as the previous set cannot be found, but a common subset of at least three sensors may be found in both measurements, this common subset of sensor combination will receive priority consideration; otherwise, the sensor combination with the lowest HDOP will be chosen.

There are some exceptions to the rule:
(1) If switching to a new combination lowers HDOP significantly and the raw multilateration solution from the new combination is not too distant from the raw multilateration solution used in the previous measurement, then the new combination would be used.
(2) For the initial message received for a target, the sensor combination with the lowest HDOP is chosen.

Thus, a key feature of this second embodiment of the present invention is the use of programming logic to determine which subset of receiver combination to use in multilateration tracking in order to smooth the trajectory.

As noted above, a third embodiment of the present invention comprises methods of correlating and combining Mode A, Mode C, and Mode S messages to enhance target-tracking performance in a passive surveillance system are provided. One aspect of this third embodiment has already been described above in connection with FIGS. 6–9 and 12.

The foundation of correlation of Mode A, Mode C, and Mode S messages and combination two or more of them into one single data stream to enhance tracking performance is built around a track memory system which may include not only track state variables but also a selective recent history of sensor data for a target of concern, including TOA with sensor ID, signal strengths, the list of sensors chosen to contribute to tracking solutions.

Past messages may then be retrieved and be compared side-by-side with new target messages for matches. This third embodiment of the present invention enhances track update rates for the following scenarios:

(1) Associating Mode A and/or Mode C messages with a Mode S target track in order to supplement Mode S data in the track update stream; and (2) Correlate Mode A and Mode C messages of an ATCRBS-only target and combine them for track updates.

There are several innovative features of this third embodiment of the present invention. In a first variation of the third embodiment of the present invention the system may combine signal strength matching with raw multilateration position matching among ATCRBS and Mode S messages. Raw signal strength at the RF front-end unit of each remote sensor is recorded and all the quantized signal strength values may be transmitted to the central server. As in radar tracking systems, the basic correlating/matching of Mode A, Mode C, and Mode S messages with individual target tracks may be dominated by the positional metric, which is a function of horizontal distance between raw multilateration solution position and the current track position, track speeds, and HDOP of the sensor combination, separation of reported altitude values and descending/ascending rates.

This first technique works reasonably well in correlating all Mode C data and a good portion of Mode A data with a Mode S-equipped target. However, there at least two cases in which the raw multilateration solution could deviate much from the true target positions, and reduce the effectiveness of positional metric:

(1) Identifiable Mode A Messages—no altitude information is available to allow precise raw multilateration solution, or the beacon code represented by the ATCRBS message matches an existing Mode S target track. Usually a nominal height is assigned for calculating initial raw multilateration solution; and (2) Unidentifiable Mode A Messages—other Mode A messages could also be a Mode C message containing altitude information. In a passive multilateration surveillance system, all those messages are initially treated as Mode C data and the raw solution obtained using the decoded altitude. If the true target altitude differs much from this decoded altitude, it is possible that the solution deviate very much from the true horizontal position.

The short-term stability of raw signal strength data recorded for each sensor for a given target is very good. When attempting to correlate two separate observations with a common set of sensors, a signal strength gating metric accounting for the common set of sensors may be devised to supplement the basic correlation/matching of Mode A, Mode C, and Mode S messages. High confidence of match or mismatch may be ascertained when both signal gating and positional metric returns similar results. When high signal strength gating metric is detected while positional metric falls short, the following hypothesis testing may be performed to determine the final outcome.

As described above in connection with FIGS. 7, 12, and 14. Hypothesis testing may be used to assist in the correlation of two ATCRBS messages of different codes or an ATCRBS and a Mode S message, and the combination of them into a single target track. Hypothesis testing in a multilateration system refers to a process of comparing two sets of message data in which new raw multilateration solution position is calculated for one set by assuming the altitude to be the same as the other set. The set that changes altitude must not contain a Mode S message. The new raw solution is then fed into positional metric to determine whether the two sets of message data belong to the same target.

This process represents an upgrade of ordinary algorithm for correlating an ATCRBS message to a track in a 2D passive multilateration surveillance system. The reason is because 2-D multilateration equation may be sensitive with respect to target altitude. If an incorrect altitude is used as an input, the calculated position may be too far away from the actual solution, making it difficult to correlate the message to the right target, which is one of the main causes of split tracks in a multilateration surveillance system. Even worse, solution may not exist for the multilateration solution. This process essentially helps increasing the track update rate and reducing the likelihood track split by recovering the correct raw multilateration solution.

Another aspect of this third embodiment of the present invention is the Method of discriminating Mode A from Mode C data in a non-Mode S target for a passive multilateration surveillance system. In a passive multilateration surveillance system, the discrimination of ATCRBS reply messages is not a trivial task. About one quarter of the codes may be from either Mode A or Mode C replies. This third embodiment of the present invention describes algorithms for resolving ambiguities under those circumstances.

Ambiguities arise when the Mode A message from a non-Mode S target contains a code that may represent not only a regular beacon code but also a legitimate Mode C altitude. The system thus receives two streams of ATCRBS messages. Each stream appears to be Mode C messages from two distinct targets because the altitudes are likely to be far apart. This invention deals with algorithms of setting up tentative coupled tracks based on these two data streams and determining the manner to merge the coupled tracks and to derive the correct altitude and beacon code for the target.

Another key feature of the third embodiment of the present invention is a direct use of Time-Difference-of-Arrival (TDOA) test to speed up the identification of multilateration data with a tracked target.

In a multilateration target tracking system, the difference in time of arrival, commonly called TDOA, between a pair of sensors that are attributed to two observations of the same target is dependent on the target speed and the relative travel direction with respect to the baseline joining the sensor pair. This property is utilized to establish a simple process to determine the likelihood a particular data is associated with a tracked target. The uniqueness of this algorithm is that it can replace the traditional position test as commonly used in radar tracking algorithm. Without having to calculate the target position from the multilateration equations, one can apply the process reliably to any observation data that share a minimum of two common sensors with the previous observation for the track in consideration.

In a fourth embodiment of the present invention, a direct multilateration target tracking system is provided by pseudorange tracking and smoothing. This fourth embodiment is a variation of the first embodiment of the present invention. The main idea is that a target filter-tracking system with state variables following closely with the measured quantities is more likely to be mathematically more well behaved. In place of target x-y positions and velocities, this tracking system use pseudoranges and the x-y velocities as state variables in an extended Kalman filtering model.

Using pseudoranges and x-y velocities as state variable allows the system operates in a high dimensional space as opposed to simply 2D in the previous multilateration surveillance tracking system, and thus keeping the full amount of information from the multitude of sensors in the tracker memory towards more effective tracking and filtering down the stretch. The additional advantage provided by this new tracking system is that it often allows missing TOA data from some sensors to be filled in. Smoother target position tracks may be obtained when the system is capable of drawing upon a larger set of TOA data as the effective HDOP usually becomes smaller.

In a fifth embodiment of the present invention, a technique for selecting best receiver combination and/or solution of multilateration equations from a multitude of combinations and/or solutions. At different times, the TOA data for a particular target may come from a multitude of sensor combinations. Because of geographical placement of sensors, measurement uncertainties and other factors affecting the time-stamping of TOA at individual sensors, solutions to the multilateration equations vary with the sensor combination chosen. In certain cases, two equally valid solutions may even exist.

The techniques disclosed in this fifth embodiment of the present application cover two unique aspects of the solution selection process. In a first aspect, error detection and correction is performed in a 2D multilateration system. As discussed above and illustrated in the Figures, when more than four sensors present TOAs for the same target, an algorithm is devised to check the consistencies among solutions generated by selective sensor combination. If inconsistency is found, further tests are done individually to determine which sensor should not contribute to the final solution.

When only four sensors present TOAs for the same target, the consistency checking algorithm is used merely to indicate an error and the message will not be used for track update if inconsistency in TOAs is detected.

The second aspect of the solution selection process is the ability to perform Ambiguity resolution and False target elimination. Depending on the geographical placement of sensors, some raw data for the multilateration system may have TOAs that yield two equally valid solutions, presenting ambiguities. This is especially a problem in a wide-area surveillance system with a small number of sensors, when only three sensors supply TOA data for a great deal of time. FitzGerald et al., U.S. Pat. No. 5,454,720, issued Oct. 3, 1995 and incorporated herein by reference, a technique is proposed for resolving solution ambiguity. The FitzGerald solution, however, requires five or more transmitters, and bases the decision logic on the asymptotes of the hyperbolas for the time-difference of arrival questions. In the current embodiment, a new technique to resolve solution ambiguity is presented that requires as little as three sensors, and is built around Bancroft solutions and potentially with the knowledge of target dynamics. The description is as follows.

In a first technique, a "majority-vote" is taken among data coming at different times with different sensor combinations. Although each sensor combination may yield two valid solutions, the true target position should center around the solutions taken by majority votes.

In a second technique, in a case where the ambiguous solutions are all from the same sensor combination, tracking target speeds may determine which one closely resembles an actual target, making use of the a priori knowledge about the target in a certain neighborhood. This technique eliminates the false targets.

In a sixth embodiment of the present invention, a technique for correcting pseudorange values with atmospheric condition is disclosed. Wave propagation speed in the troposphere varies with elevation, with speed generally increasing with altitude, although there are exceptions in the presence of extreme humidity and temperature conditions. The refraction effect causes the propagation path to bend downward to the Earth surface. Solutions of multilateration equations are affected in several aspects:

(1) The target appears to come from the direction of higher than real altitude.

(2) Apparent path lengths from the apparent target position to all sensors also deviates from the true path lengths from the true target position.

In a wide area multilateration surveillance system, the deviation terms described above may become very significant as the sensors are also far apart.

This sixth embodiment of the present invention describes algorithms for recovering the true target position in a 2D or 3D multilateration surveillance system. The key idea is to derive the correction factor to the measured TOA value for each sensor from the differences between the apparent path length and the true path length.

A multilateration system with four or more sensors receiving transponder signals may be used to determine the three dimensional position of a target. The principle is the same as 2D positioning. For each sensor, the time of arrival (TOA) clock value is stamped and transmitted to the central server. Target coordinates (x,y,z) and the time of emission are solved from the basic ranging equations, which relate the 3D position to the differences in TOA (TDOA or DTOA).

Previous publications such as D. C. Rickard, D. J. Sherry, S. J. Taylor, "The development of a prototype aircraft-height monitoring unit utilizing an SSR-based difference in time of arrival technique," International Conference Radar 92 (Conf. Publ. No. 365), 1992, p 250–3 and D. E. Manolakis and C. C. Lefas, "Aircraft geometric height computation using secondary surveillance radar range differences," IEE Proceedings-F, Radar, Sonar, Navigation, vol. 141, No.2, pp. 139–148, 1994, both of which are incorporated herein by reference, have described the usage of such system to perform aircraft height monitoring function.

In those systems, however, the effect of radio wave refraction in the Earth atmosphere has not been properly accounted for. In surveying applications using GPS, similar concerns over varying refractive index of the Earth's atmosphere on positioning accuracy have been studied experimentally. For example, refer to the paper A. Alber, "GPS surveying with 1 mm precision using corrections for atmospheric slant path delay" (Geophysical Research Letter, vol. 24, no. 15, pp. 1859–62, 1 Aug. 1997), incorporated herein by reference. For practical applications of ground-based multilateration surveillance systems in which targets of concern are in the troposphere, the refraction effect can cause significant bending of propagation paths, unlike in the GPS. This embodiment outlines an analytical approximation formulation for predicting the effect of ray bending and furthermore develops an iterative procedure for adjusting multilateration equations such that the solution yields the correct target position.

The basic ranging equation is well-known, $$\sqrt{(x-x_i)^2+(y-y_i)^2+(z-z_i)^2}=c\cdot(t_i-t),$$

Here it is assumed that the velocity of radio wave propagation is constant. In real Earth atmosphere, the propagation velocity varies with the geometric height above the sea level or, to be exact, with the spatial location. It is customary to describe the velocity in terms of refractive index n, which is the ratio of free-space velocity over the real velocity.

In the troposphere, or lower atmosphere, the refractive index is given as:

$$n = \frac{77.6}{T}(p+4810e/T)10^{-6}+1,$$

where p is the total air pressure in millibars, e is the partial pressure of water vapor, and T is the temperature in Kelvin. See, for example, U.S. Standard Atmosphere 1962, U.S. Government Printing Office, Washington, D.C. December 1962, incorporated herein by reference.

It can be further shown that (e.g., Radiowave propagation, Lucien Boithias, McGraw-Hill, New York : 1987, incorporated herein by reference) that the logarithm of total air pressure is directly proportional to the geometric height above the sea level, and that within limited range of height in normal weather condition n can be approximately as a linear function of geometric height. Using this approximate relation, one can calculate the relation between true propagation delay—the time it takes for radio wave to propagation from one point to another along the bending propagation path—, and the "virtual propagation delay"—the propagation delay along the straight path with constant speed.

Figure 18:
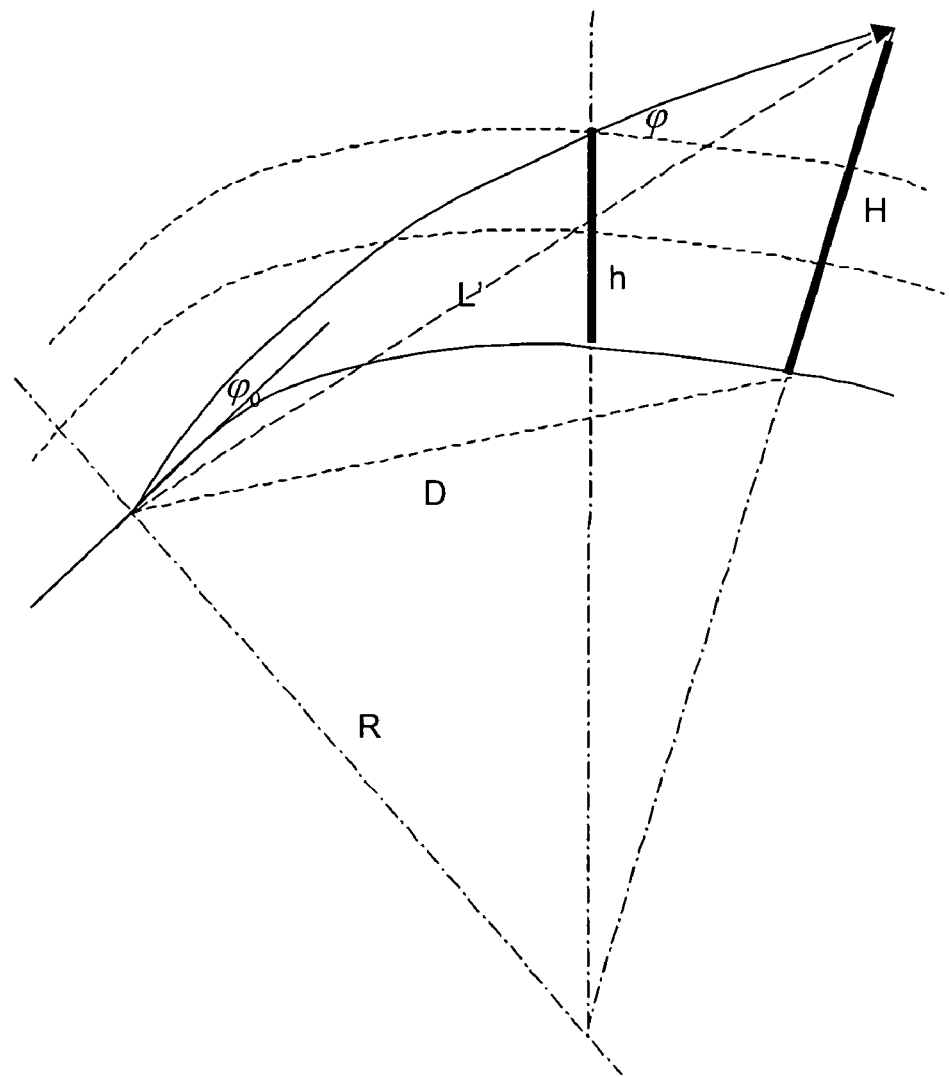
FIG. 18 is a diagram illustrating the effect of radio wave refraction in the Earth atmosphere.

Referring to the drawing in FIG. 18, let R be the effective radius of curvature of the local sea level surface, $n_0$ be the refractive index at the sea level, $\phi_0$ be the initial grazing angle of wave propagation, and $\phi(h)$ be the grazing angle along the propagation path, Snell's law in the spherical coordinate system is given by:

$$n_0 \cdot R \cos \phi_0 = n(h)\cdot(R+h)\cos \phi(h)$$

$$n(h)=n_0(1+\kappa\cdot h)$$

and the propagation velocity at the sea level given by $c_0=c/n_0$.

Let the target height above the local sea level to be H, the true propagation delay T and the virtual propagation delay $T_v$ can be obtained in closed form:

$$T = \frac{n_0}{c_0\cos\varphi_0\sqrt{2A}}\left[\left(2+\frac{2}{3}\kappa\cdot H-\frac{4}{3}\kappa\cdot B\right)\sqrt{H+B} - \left(2-\frac{4}{3}\kappa\cdot B\right)\sqrt{B}\right]$$

$$D = \frac{1}{\sqrt{2A}}\left[\left(2-\frac{2}{3}A\cdot H+\frac{4}{3}A\cdot B\right)\sqrt{H+B} - \left(2+\frac{4}{3}A\cdot B\right)\sqrt{B}\right],$$

$$L' \cong R\cdot\left[1+\frac{D^2}{2R}\cos^2\varphi_0+\frac{D}{R}\sin\varphi_0\right]$$

$$T_v = L'/c_0$$

where:

$$A = \frac{1}{R}+\kappa$$

$$B = \frac{\tan^2\varphi}{2A}$$

The above formulas enable us to calculate the differences between the true propagation delay and the virtual propagation delay ($T_v-T$) for every sensor in the system. This helps us determine the true location of the target using the unmodified ranging equations. The way this works is by adjusting TOA values for every sensor before solving the multilateration system equations, and then calculate these differences in propagation delays once the solution is found. If this difference for every single sensor matches the respective original TOA adjustment, then we have found the true target location.

The reason is as follows. For sensor n, assume the adjusted TOA values to be $TOA'_n=TOA_n+\Delta T_n$, the true propagation delay to be $T_n$, and the virtual propagation path delay to be $T_{n,v}$. If $\Delta T_n$ is equal to the differences, in propagation delays, we have $\Delta T_n=T_{n,v}-T_n$, and the time of emission according to the unmodified ranging equation is given by:

$$TOE' = TOA'_n - T_{n,v} = TOA_n + \Delta T_n - T_{n,v}$$
$$= TOA_n + T_{n,v} - T_n - T_{n,v}$$
$$= TOA_n - T_n$$

This is exactly the same as the true time of emission. The only way it could happen for all the sensors is that this "virtual target" location must be the true target location. In summary, finding the true target location is reduced to solving for $\{\Delta T_n\}, n=1, \ldots, N$, which satisfy the following equations:

$$\Delta T_n+T_n-T_{n,v}=0$$

The TOA correction factors can improve not only 3D multilateration surveillance systems but also 2D multilateration surveillance system because the governing system equations are exactly the same.

As $T_n$ and $T_{n,v}$ are nonlinear functions of TOA correction factors $\Delta T_n$, a practical way of finding the approximate solution is by using iterative least-squares solver, a technique which is commonly implemented in GPS receivers. (e.g., P. S. Noe, K. A. Myers, and T. K. Wu, "A Navigation Algorithm for the Low-Cost GPS Receiver," Navigation, J. of the Institute of Navigation, Vol. 25, No. 2, 1978, pp. 258–64, incorporated herein by reference). A brief description of the general procedure for the least squares algorithm of the present embodiment is also provided below. The iterative approach for the present embodiment is outlined in the block diagram of FIG. 17. The key to the success of any iterative technique is to obtain good initial estimates.

Figure 17:
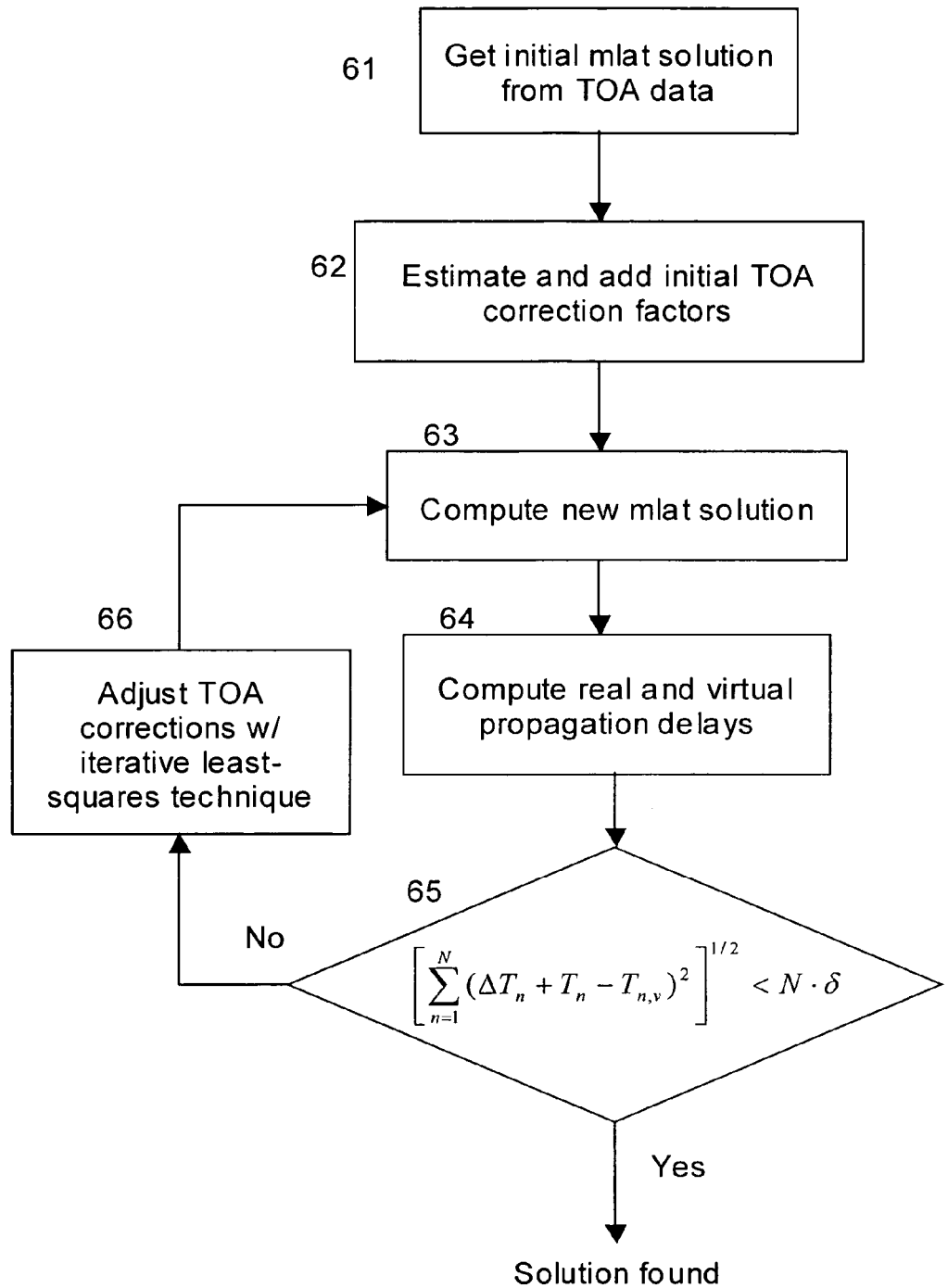
FIG. 17 is a block diagram illustrating a sixth embodiment of the present invention.

FIG. 17 is a block diagram illustrating a sixth embodiment of the present invention. Referring to FIG. 17, in step 61, an initial Mlat solution is obtained from TOA data to calculate initial raw multilateration solutions without regards to atmospheric conditions. Based on the knowledge of atmospheric profile between each sensor and apparent target locations, initial TOA correction factors are estimated and added to the TOA data, and the nonlinear equation relating true target height with apparent target height at a given range may be derived. Using the apparent target location as input, the nonlinear equation is solved for what would be true height and range as seen by each sensor.

In step 62, comparing this preliminary true height and range information and the apparent target range information, the TOA correction term is estimated for each sensor. The detailed scheme for obtaining initial TOA correction factors is illustrated in block 62, immediate after the initial multi-lateration solution location is calculated using unmodified ranging equations in step 61.

Let $A^{(0)}$ be this initial Mlat solution location, and $T_3^{(0)}$ be the apparent propagation delay to sensor $S_3$ in the ranging equation, (The same TOA correction estimate procedure can be done for the other sensors as well.) a real propagation path to "virtual target" $A'_3$ can be derived numerically that:

(1) is on the same plane which contains $A^{(0)}$, $S_3$, and intersects a great circle on the mean sea level surface,
(2) has real propagation delay equal to $T_3^{(0)}$ and identical grazing angle at sensor $S_3$, and
(3) bends along the path according to the real refractive index profile.

In step 63, applying the TOA correction term to each sensor, the new solution that pinpoints the true target position may be calculated without correction for refractions.

In step 64, the real propagation delay $T_d$ may be calculated by comparing the new Mlat solution with the initial solution. In step 65 if the $t_d$ is close to the unmodified pseudorange, then the solution is considered found. If not, new TOA corrections are computed in step 66 and processing returns to step 63.

Figure 19:
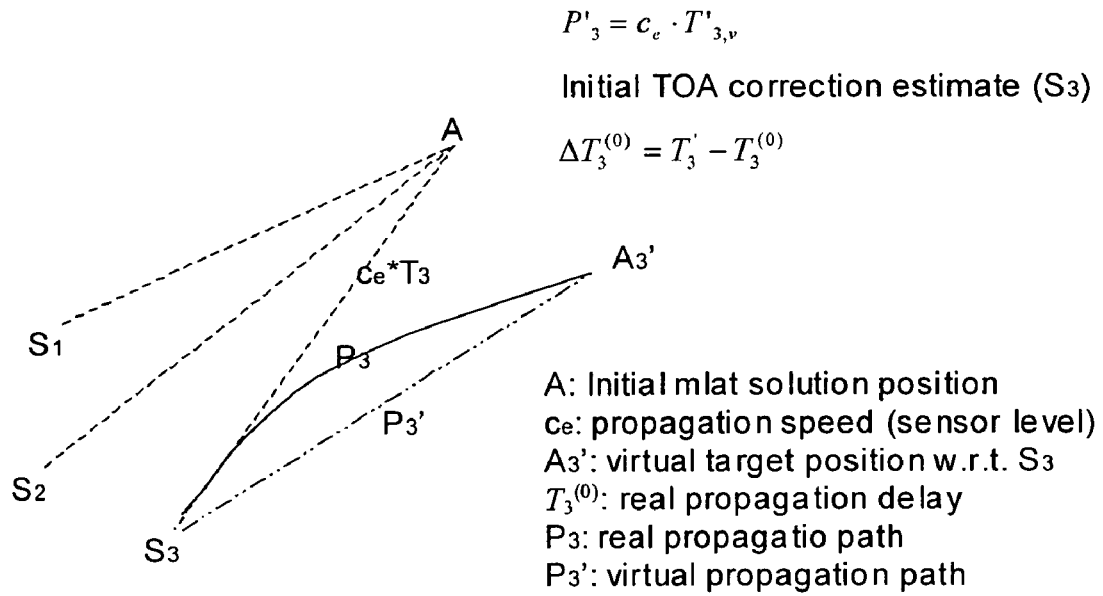
FIG. 19 is a diagram illustrating a calculation solution for virtual propagation delay for the embodiment of FIG. 17.

Referring back to step 64 and to FIG. 19, once $A'_3$ is located, a "virtual propagation delay" $T'_{3,v}$ may be determined by the equation $$P'_3 = c_e \cdot T'_{3,v}$$

The initial $TOA_3$ correction estimate may then be set to $$dTOA_3^{(0)} = T_3' - T_3^{(0)}$$

For aircraft height monitoring applications, this initial estimate is expected to be close to the final solution. The reason is that the correction is expected to be more or less proportional to the differences in target and ground sensor altitudes, and in this particular applications, the additional correction term, which is proportional to the altitude difference between the true solution and the initial solution, would be significantly less than the dominant difference between the target and the ground sensor.

The following is an overview of the least-squares algorithm used in the present embodiment of the present invention. In general we are interested in solving the following system equation for M variables with N observations $$f_n(\overline{X}) = 0, n = 1, \ldots, N, \text{ with } \overline{X} = \begin{bmatrix} x_1 \\ \vdots \\ x_M \end{bmatrix}$$

When N>M, the system is mathematically over-determined, and exact solution may not exist. Approximation solution is solved instead, generally by a least-squares technique, which seeks to minimize the cost function:

$$F(\overline{X}) = \sum_{n=1}^{N} f_n(\overline{X})$$

A closed-form solution is available when all $f_n(\overline{X})$ are linear functions of $\overline{X}$; otherwise, an iterative algorithm can be used to seek successive approximation solutions. The way this iterative algorithm works is by assuming that the optimal solution $\overline{X_p}$ can be approximated by an estimate $\overline{X_0}$. Let $\overline{X_p} = \overline{X_0} + \overline{X'}$, we obtain a linear approximation of the cost function:

$$F(\overline{X}) \cong \sum_{n=1}^{N} \left[ f_n(\overline{X_0}) + \sum_{m=1}^{M} \frac{\partial f_n}{\partial x_m} x'_m \right]^2 = \sum_{n=1}^{N} H_n^2(\overline{X'})$$

Note that all $H_n(\overline{X'})$ are linear functions of $\overline{X'}$, the least-squares solution to the above is given by $$\overline{X'} = (\overline{G}^T \cdot \overline{G})^{-1} \cdot \overline{G}^T \cdot \overline{B},$$

where $$G_{i,j} = \frac{\partial f_i}{\partial x'_j}.$$

$$B_j = -f_j(\overline{X_0})$$

In the iterative algorithm, an initial estimate is calculated by other technique, and the linear approximation shown above is used to solve the correction term $\overline{X'}$. This term is added to in order to form the new estimate for the next iteration. The procedure is repeated until the estimated solution converges. A threshold for the number of iterations should be set up lest the solution fails to converge.

In a seventh embodiment of the present invention, an improved height determination technique for regions of poor VDOP in a 3D multilateration system is provided. In a 3D multilateration system, optimum HDOP and optimum VDOP may not occur at the same locations and may be coming from the same sensor combination. This makes it more difficult to achieve consistent 3D tracking performance, especially for height determination applications.

A new height determination algorithm is developed to obtain better vertical accuracy in places with good HDOP. This algorithm is built upon the 2D tracking system, taking advantage of the altitude information contained in Mode C and Mode S messages that make possible robust 2D tracking of horizontal positions. For any given time, a modified set of 3D multilateration equations may be formed by setting the x-y position of the target with that given by the 2D tracking system. The solution of the unknown altitude may then be obtained by the least-squares technique. The effective DOP under this modified set of multilateration equations is generally better than that given by the full 3D multilateration equation. For target locations with good HDOP in the 2D tracking system, this approach is capable of improving the vertical accuracy significantly.

This seventh embodiment of the present invention deals with a mathematical technique for improving height determination in a 3D multilateration surveillance system. The basic idea is to make use of as much received data as possible, so as to maximize the effectiveness of tracking filter in such systems while minimize the corruption of the tracking filter owing to poor input data. In order to achieve these goals, input TOA data are used to drive not only the main 3D multilateration system tracking filter but also a separate 2D multilateration system tracking filter. When the input data is incapable of generating an accurate estimate of target 3D solution, the 2D multilateration system is then used to coast the horizontal movement of the target and, with the help of a "modified least-squares algorithm", to estimate the target height.

Such indirect solution may then be supplied to the 3D multilateration system for target position update. The advantages of this "modified least-squares algorithm", under the 2D multilateration system are:

When TOA data comes from only 3 sensors, the ordinary 3D multilateration equation is underdetermined and cannot be used to obtain target position.

In other cases when TOA data comes from sensors which yield a poor VDOP at the target location, the height accuracy from the ordinary 3D multilateration equation is usually not as good as that obtained from the "modified least-squares algorithm".

Figure 20:
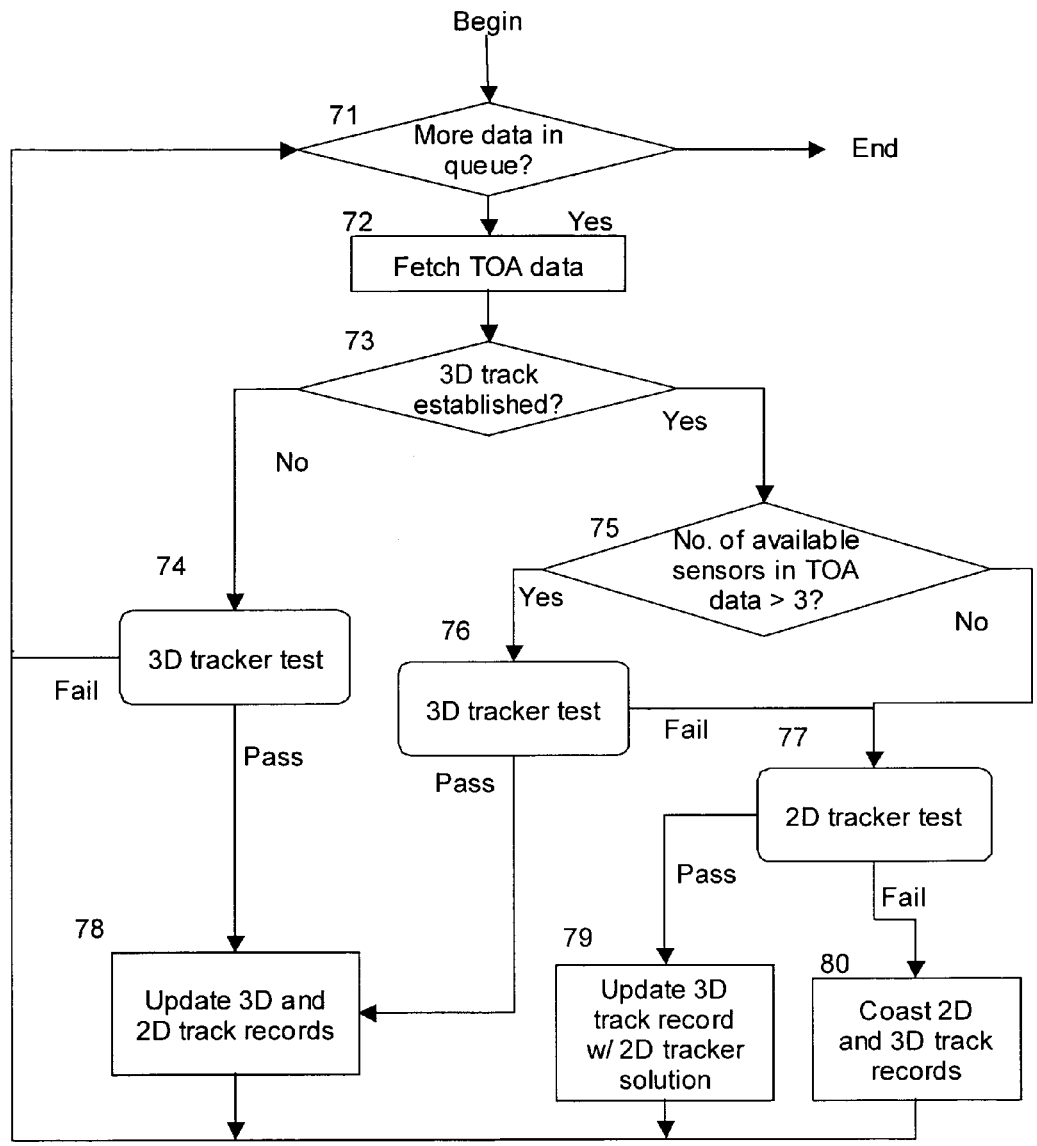
FIG. 20 is a diagram illustrating a seventh embodiment of the present invention.
Figure 21:
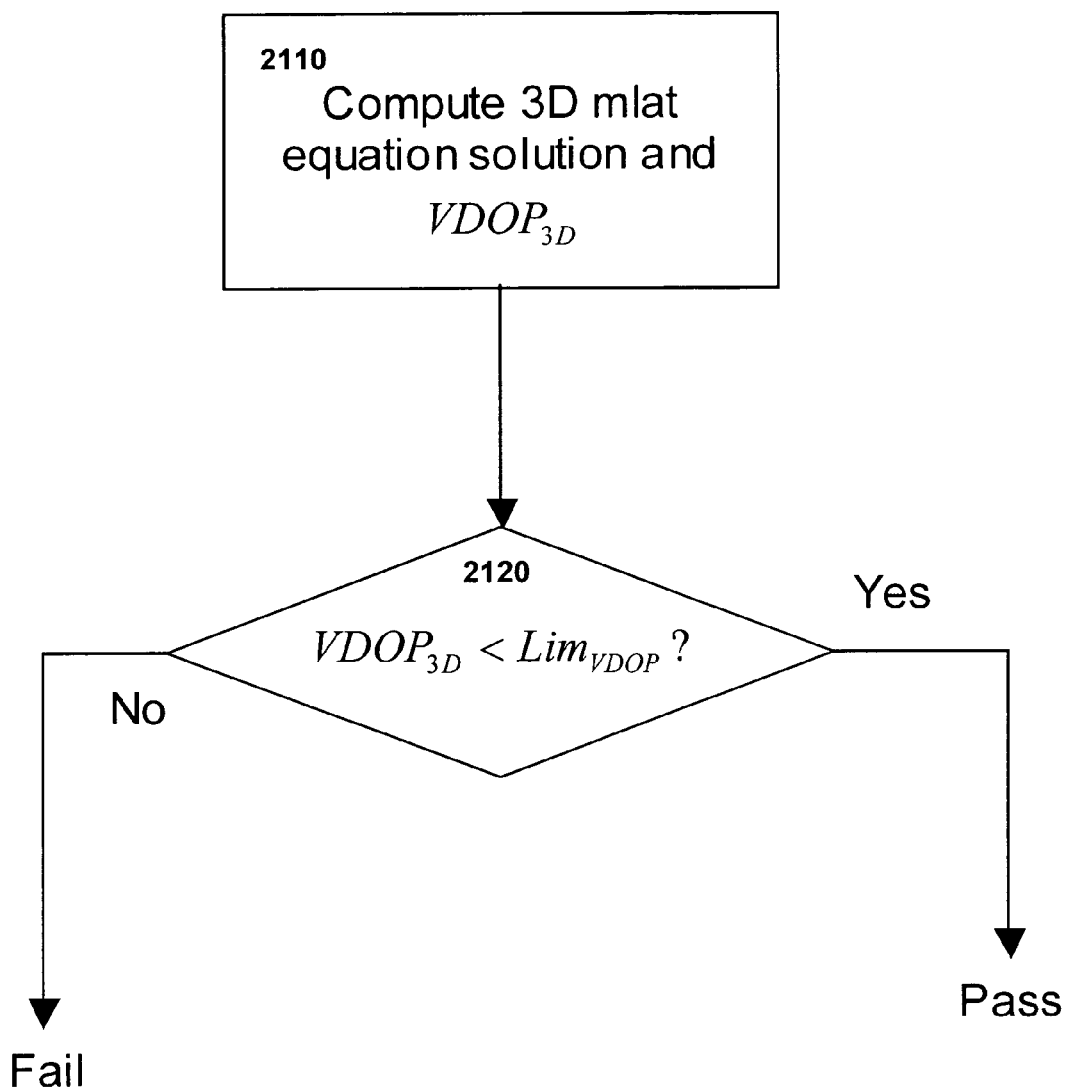
FIG. 21 is a diagram illustrating the processes of steps 74 and 76 of FIG. 20.
Figure 22:
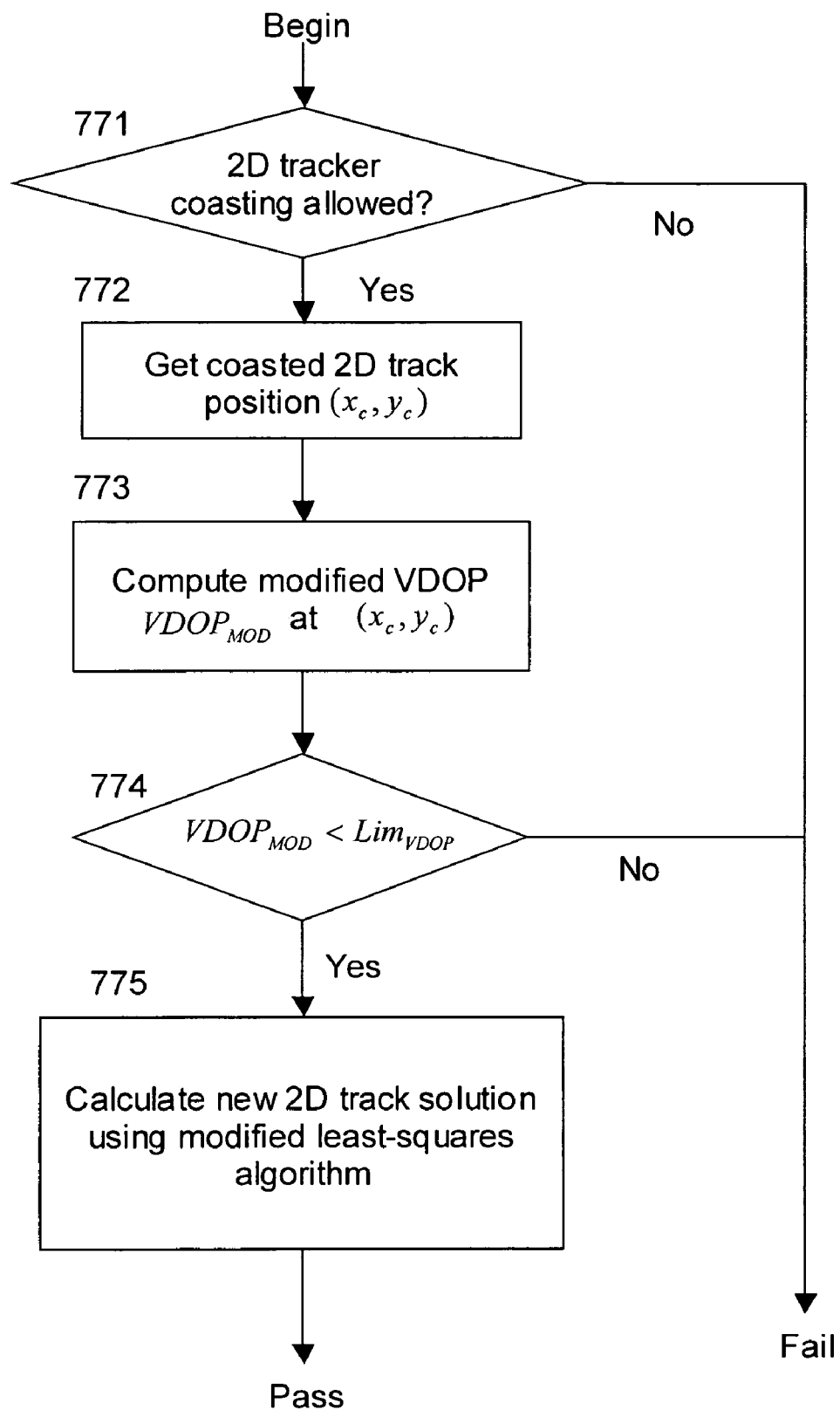
FIG. 22 is a diagram illustrating the processes of step 77 of FIG. 20.

FIGS. 20–22 describe the procedure for implementing this scheme. It is assumed that input TOA data belonging to distinct targets have been identified and separated from one another; therefore the data in the processing cycle here are just successive snapshots in time for a single target. Also the TOA data with less than three sensors have been discarded because they are insufficient for even 2D solutions.

As the procedure begins in step 71, it is necessary to initialize track records with 3D multilateration equation, because in the 2D multilateration equation the horizontal position can vary much with the target altitude, the true value of which may differ much from the reported Mode C altitude. The processing loop of steps 71, 72, 73, 74, and 78 continues until there are sufficient target position snapshots to establish a steady track. At that point extended Kalman filter systems are set up to track and filter the target movement in the 3D and 2D spaces, hence forth termed 3D tracker and 2D tracker, respectively, and processing passes to step 75.

The logic to determine which tracker takes precedence in subsequent processing steps is given in the rest of the flowchart. First of all, in step 75, if number of sensors in the TOA data is over 3, the system will try to use the 3D tracker as illustrated in step 74 and 76.

FIG. 21 is a diagram illustrating the processes of steps 74 and 76 of FIG. 20. In step 2110, a preliminary raw solution may be calculated from the multilateration equation, and then the predicted VDOP is compared against a threshold $Lim_{VDOP}$ in step 2120. If it passes the test, 3D tracker is used to generate the updated track position. Then the update target z-coordinate is plugged into the regular 2D tracker to update the track position in step 78 of FIG. 20.

However, if there are only 3 sensors in the TOA data, or the VDOP is too high in the 3D tracker, the fallback to 2D tracker takes place in step 77. FIG. 22 is a diagram illustrating the processes of step 77 of FIG. 20. For 2D tracker to be used, the system first checks if the track is still in good order for target to coast in step 771. Once that hurdle is passed, the coasted x-y position is generated at $(x_c, y_c)$ in step 772.

At the new location, the modified VDOP $VDOP_{MOD}$ is calculated in step 773 and compared again with the threshold $Lim_{VDOP}$ in step 774. A good $VDOP_{MOD}$ provides confidence in moving to the next step, which calculates the target z-coordinate using the coasted x-y position $(x_c, y_c)$ as the input to a modified least-squares algorithm in step 775.

If everything fails, there is no choice but to coast both 3D and 2D track records, as illustrated in step 80 of FIG. 20. This is the same as in conventional 3D tracking systems.

The advantage of this seventh embodiment over conventional 3D multilateration tracking system is that it allows the user to "extend the last mile" in those two scenarios described above. This is based on the fact that in many cases (at least in civilian aircraft) the horizontal movement tends to be more stable and predictable than the vertical movement. In addition, HDOP for ground-based multilateration systems may still be very decent in those places where VDOP is poor.

For the purposes of the present application the following terms, as used in the above description are defined as follows. To "coast" a track means generating a predicted track position based on previously filtered position and estimated velocity vector. "2D tracker" versus "3D tracker" means that in a 2D tracker, the z-coordinate of the target is an input. In the present invention, when 3D tracking is feasible it will be activated first to obtain the updated z-coordinate, and this number is supplied to the 2D tracker.

A Modified least-squares algorithm and modified VDOP, as discussed above in connection with this seventh embodiment is provided as follows. In the multilateration ranging equation $$\sqrt{(x-x_i)^2+(y-y_i)^2+(z-z_i)^2}=c\cdot(t_i-t), \text{ for } i=1, \ldots, N$$

by setting $x=x_c, y=y_c$, the coasted 2D target position, one is left with over-determined nonlinear equations for z and t. Since exact solution likely does not exist, iterative least-squares technique is applied. Refer to the notation in the sixth embodiment set forth above, the unknown vector and the cost-function are given as:

$$\overline{X} = [z \ t]^T$$

$$f_i(\overline{X}) = \left\{\sqrt{(x_c - x_i)^2 + (y_c - y_i)^2 + (z - z_i)^2} - c\cdot(t_i - t)\right\}^2$$

$$F(\overline{X}) = \sum_{i=1}^{N} f_i(\overline{X})$$

The form is similar to the regular multilateration system equation and hence quantities similar to regular HDOP and VDOP, which relates the statistical bounds of solution error in horizontal and vertical dimension to the clock measurement error, may be derived.

Using the same notation, we can find the "modified VDOP", which related the statistical bound of error in z to the clock measurement error, $$H=(G^T\cdot G)^{-1}$$

$$VDOP_{MOD}=\sqrt{H_{11}}$$

While the preferred embodiment and various alternative embodiments of the invention have been disclosed and described in detail herein, it may be apparent to those skilled in the art that various changes in form and detail may be made therein without departing from the spirit and scope thereof.

It should be noted that the present invention has been described in connection with the preferred embodiment. However, as one of ordinary skill in the art may appreciate, elements of the invention may be practiced individually or in various sub-combinations not including all of the elements of the preferred embodiment, and still fall within the spirit and scope of the present invention.

We claim:

1. A method of tracking targets, comprising the steps of:
receiving in a plurality of sensors, a data signal from a target, the data signal including identification information,
generating, in the plurality of sensors, a time stamp TOA indicating when the data signal is received at each of the plurality of sensors,
setting a cycle end time $T_{end}$ as a preset cutoff time at a central server to release a batch of queued input data to a tracking module for processing,
fetching a new TOA value,
comparing in a first comparing step, a TOA with $T_{end}$ value and if the TOA value is later than the $T_{end}$ value, performing a split track check and returning to the setting cycle end time step,
if the TOA value is greater than or equal to the $T_{end}$ value, calculating initial solutions of 2D multilateration equations from target track data, wherein if the initial solutions for the 2D multilateration equations fail, returning to the setting cycle end time step,
if the initial solutions of the 2D multilateration equations pass, performing a data-track association test to determine whether the data-track data is associated with an existing target track, should be a new track, or should be rejected,
wherein if the data is associated with an existing track, the existing track position and velocities are filtered and updated with the latest record data, fetching a new TOA data, and returning to the setting a cycle end time step,
wherein if the data-track data is not associated with an existing track, creating a new track and returning to the setting a cycle end time step, and
wherein if outlier data is generated, the data is rejected and returning to the setting cycle time step.

2. The method of claim 1, wherein outlier data comprises a set of TOA data which is determined by the tracking system to be associated with an existing track but is suspected to suffer from some inconsistencies, and would thus not be used to update the track record.

3. The method of claim 1, wherein said step of performing a data track association test further comprises the steps of:
determining from the initial multilateration solution and TOA data whether the TOA data comprises Mode S data,
wherein if the TOA data is not Mode S data, all tracks are tested for a match,
wherein if there is no match, a new track is created,
wherein if a match exists, track position and velocities are filtered and updated, and
wherein if outlier data is detected the TOA data is rejected.

4. The method of claim 3, wherein in said step of performing a data track association test, wherein if the TOA data is Mode S data, first testing the mode S tracks for a match and then testing the ATCRBS tracks for a match.

5. The method of claim 3, wherein said step of testing the mode S tracks for a match comprises the steps of:
retrieving next track data from initial multilateration solution,
retrieving TOA data,
determining if the next track is not the final track,
wherein if the next track is not the final track, performing an altitude test,
wherein if the altitude test fails, returning to the step of retrieving next track data from the initial multilateration solution, and
wherein if the altitude test passes, performing a TDOA/Position test and signal strength test.

6. The method of claim 4, wherein said step of testing the mode S tracks for a match comprises the steps of:
retrieving next track data from initial multilateration solution,
retrieving TOA data,
determining if the next track is not the final track,
wherein if the next track is not the final track, performing an altitude test,
wherein if the altitude test fails, returning to the step of retrieving next track data from initial multilateration solution, and
wherein if the altitude test passes, performing a TDOA/Position test.

7. The method of claim 5, wherein said step of performing a TDOA/Position test further comprises the steps of:
retrieving next track data from the initial multilateration solution,
retrieving TOA data,
obtaining a list of common sensors between input data and previous track data, the list including all of the sensors used in obtaining both input data and previous track data.

8. The method of claim 6, wherein said step of performing a TDOA/Position test further comprises the steps of:
retrieving next track data from the initial multilateration solution,
retrieving TOA data,
obtaining a list of common sensors between input data and previous track data, the list including all of the sensors used in obtaining both input data and previous track data.

9. The method of claim 7, wherein said step of performing a TDOA/Position test further comprises the steps of:
determining whether more than three sensors are in common,
wherein if more than three sensors are in common, performing a TDOA hypothesis test,
wherein if the TDOA hypothesis test passes the two tracks are determined to be from the same target,
wherein if the TDOA test fails, the target tracks are deemed not related.

10. The method of claim 8, wherein said step of performing a TDOA/Position test further comprises the steps of:
determining whether more than three sensors are in common,
wherein if more than three sensors are in common, performing a TDOA hypothesis test,
wherein if the TDOA hypothesis test passes the two tracks are determined to be from the same target,
wherein if the TDOA test fails, the target tracks are deemed not related.

11. The method of claim 9, wherein said step of performing a TDOA/Position test further comprises the steps of:
performing a position test to determine whether the present data and previous track are indicating the same position within a predetermined tolerance,
wherein if the position test passes, the track position and velocities are filtered and updated,
wherein if outlier data is detected, the TOA data is rejected, and
wherein if the position test fails, a signal strength comparison test is performed.

12. The method of claim 10, wherein said step of performing a TDOA/Position test further comprises the steps of:
 performing a position test to determine whether the present data and previous track are indicating the same position within a predetermined tolerance,
  wherein if the position test passes, the track position and velocities are filtered and updated,
  wherein if outlier data is detected, the TOA data is rejected, and
  wherein if the position test fails, a signal strength comparison test is performed.

13. The method of claim 11, wherein said step of performing a signal strength test further comprises the steps of:
 comparing the relative signal strength of received signals is compared,
  wherein if the relative signal strength of received signals is not within a certain tolerance,
 determining that the data-track data is not associated with an existing track, creating a new track and returning to the setting a cycle end time step, and
  wherein if the relative signal strength of received signals is substantially the same strength, a hypothesis test is performed.

14. The method of claim 12, wherein said step of performing a signal strength test further comprises the steps of:
 comparing the relative signal strength of received signals is compared,
  wherein if the relative signal strength of received signals is not within a certain tolerance,
 determining that the data-track data is not associated with an existing track, creating a new track and returning to the setting a cycle end time step, and
  wherein if the relative signal strength of received signals is substantially the same strength, a hypothesis test is performed.

15. The method of claim 13, wherein said step of performing a hypothesis test further comprises correlating two ATCRBS messages of different codes or an ATCRBS and a Mode S message, and the combination of them into a single target track by:
 comparing two sets of message data in which a new raw multilateration solution position is calculated for one set by assuming the altitude to be the same as the other set, wherein the that changes altitude must not contain a Mode S message, and
 feeding the new raw solution is into positional metric to determine whether the two sets of message data belong to the same target.

16. The method of claim 14, wherein said step of performing a hypothesis test further comprises correlating two ATCRBS messages of different codes or an ATCRBS and a Mode S message, and the combination of them into a single target track by:
 comparing two sets of message data in which a new raw multilateration solution position is calculated for one set by assuming the altitude to be the same as the other set, wherein the that changes altitude must not contain a Mode S message, and
 feeding the new raw solution is into positional metric to determine whether the two sets of message data belong to the same target.

17. The method of claim 15, wherein if said hypothesis test fails, determining the data-track data is not associated with an existing track, creating a new track and returning to the setting a cycle end time step, and
 wherein if the hypothesis test passes, a match exists and track position and velocities are filtered and updated.

18. The method of claim 16, wherein if said hypothesis test fails, determining the data-track data is not associated with an existing track, creating a new track and returning to the setting a cycle end time step, and
 wherein if the hypothesis test passes, a match exists and track position and velocities are filtered and updated.

19. The method of claim 9, wherein in said step of performing a TDOA/Position test,
 if outlier data is detected, rejecting the TOA data and returning to the set cycle end time step,
 if the TDOA/Position test fails, returning to the step of retrieving next track data and TOA data, and
 if the TDOA/Position test passes, adding the track to a candidate list in step and returning to the step of retrieving next track data from initial Multilateration solution and TOA data.

20. The method of claim 10, wherein in said step of performing a TDOA/Position test,
 if outlier data is detected, rejecting the TOA data and returning to the set cycle end time step,
 if the TDOA/Position test fails, returning to the step of retrieving next track data and TOA data, and
 if the TDOA/Position test passes, adding the track to a candidate list in step and returning to the step of retrieving next track data from initial multilateration solution and TOA data.

21. The method of claim 5, wherein in said step of determining if the next track is not the final track further comprises the steps of:
 if the final track is detected, selecting the closest track from the candidates from the step of adding the track to a candidate list,
 if no closest track exists, then no match exists and the data-track data is not associated with an existing track, creating a new track and returning to the setting a cycle end time step,
 if a closest track exists, a match exists, track position and velocities are filtered and updated, and
 if outlier data is detected, the TOA data is rejected.

22. The method of claim 6, wherein said step of determining if the next track is not the final track further comprises the steps of:
 if the final track is detected, selecting the closest track from the candidates from the step of adding the track to a candidate list,
 if no closest track exists, then no match exists and the data-track data is not associated with an existing track, creating a new track and returning to the setting a cycle end time step,
 if a closest track exists, a match exists, track position and velocities are filtered and updated, and
 if outlier data is detected, the TOA data is rejected.

23. The method of claim 4, wherein said step of testing ATCRBS tracks for a match comprises the steps of:
 retrieving a next track data from initial the multilateration solution and TOA data,
 If the retrieved track data is not the final track, performing a Mode-S track check,
  wherein if the track is not mode-S, returning to said retrieving next track data step,
  wherein if the track is mode-S, a Mode S address match is determined, and a TDOA/Position test is performed to determine whether the track data defines the same positions within a predetermined parameter, wherein if the TDOA/position test fails the TOA data is rejected, wherein if the TDOA/position test passes, a match exists, track position and velocities are filtered and updated.

24. The method of claim 23, further comprising the steps of:

If a match ATCRBS tracks exists, track target type is set to mode S and a match exists, track position and velocities are filtered and updated.

25. The method of claim 1, wherein said step of performing a split track check further comprises the steps of:

setting a top record from the track memory stack to be track 1, determining whether any more tracks are present, if more tracks are present, retrieving a next record below, determining which types of track pairing is occurring, wherein track pairing determines whether two distinct track records are associated with the same target, or represent two separate target paths, if the two tracks use different data types, performing a merger check to determine whether the two tracks are from the same target if the two tracks are not related, fetching a next track data for further comparison if the tracks are related to the same target, merging the two tracks, setting the pointer to the next record of track 1 as the top of the stack, if the next record is the only record in the stack, cleaning up the input queue, if the other track records are in the stack, returning to the step of split track checking.

26. The method of claim 1, where in said step of calculating initial solutions of 2D multilateration equations from target track data comprises the step of:

determining the multilateration ranging equation may be written as:

$$\sqrt{(x-x_i)^2+(y-y_i)^2+(z-z_i)^2}=c\_(t_i\text{-}t)$$

where $(x_i, y_i, z_i, t_i)$ represent local Cartesian coordinate and time of arrival at sensor number i, wherein the vector x, y, z, t) contains the target coordinate and the time of emission, for 2-D tracking, setting the target z-coordinate using a reported altitude, and if a reported altitude is not available, setting a nominal z-coordinate, A minimum of three sensors are needed for solving the remaining unknowns (x,y,t).

27. The method of claim 26, wherein said step of calculating initial solutions of 2D multilateration equations from target track data further comprises the step of:

inputting TOA data for all visible sensors, wherein visible sensor comprises sensors which receive the data signal from a target, updating an admitted sensor list based upon input TOA data, obtaining baseline Bancroft solutions for all admitted sensors, if the number of sensors is equal to or less than three, terminating processing, and if more than three sensors are present, generating four sets of three-sensor combinations from the sensor list, and generating Bancroft solutions for each combination of three sensors.

28. The method of claim 27, wherein said step of calculating initial solutions of 2D multilateration equations from target track data further comprises the step of:

testing consistency of the solutions for all sets, if the solutions are consistent, obtaining the best Horizontal Dilution Of Precision (HDOP) solution from all the sets, where Horizontal Dilution Of Precision (HDOP) represents Horizontal Dilution Of Precision (HDOP), the approximate ratio of root-mean-squares error in the horizontal plane to the root-mean-squares error of pseudorange, where pseudorange is equal to the product of the speed of radio wave and the measured travel time between the sensor and the target.

29. The method of claim 28, wherein said step of calculating initial solutions of 2D multilateration equations from target track data further comprises the step of:

if the solutions are inconsistent, and if the number of sensors is greater than four, a residuals test is performed and the number of sensors in the admitted sensor list is downsized, if the solutions are inconsistent, and if the number of sensors is already four, the process is terminated and the solutions rejected.

30. The method of claim 27, wherein said step of generating four sets of three-sensor combinations from the sensor list and generating Bancroft solutions for each combination of three sensors further comprises the steps of:

inputting a baseline multilateration solution, where the three nearest sensors to an (x,y) position are used as base set, replacing selected data from one of the three selected sensors with data from one of the remaining sensors and obtaining a new Bancroft solution from the new three sensor combination, determining whether any other combination of sensors has not yet been tested, if so, obtaining new Bancroft solutions for other combinations, if not selecting from among the sensor combinations tested, the one with the best Horizontal Dilution Of Precision (HDOP) and creating a derivative set, where the Best Horizontal Dilution Of Precision (HDOP) solution is the one with the lowest value of Horizontal Dilution Of Precision (HDOP) among the 3-sensor subsets considered.

31. A direct multilateration 2-D target tracking system comprising:

a plurality of sensors for receiving signals from an aircraft;

means, coupled to the plurality of sensors, for generating time stamp data indicating when the signals are received at each of the plurality of sensors;

means for generating aircraft position x-y position data and velocity by multilaterating the time stamp data;

means for filtering the time stamp data using an extended Kalman Filter technique where state variables in the filter are target x-y positions and velocities, the filter based on linearized statistical target dynamics state equations and statistical measurement equations;

wherein depending on the type of target movement, the dynamics state equations may be one of the two forms: one optimized for linear constant-speed motion, and the other optimized for targets under longitudinal or lateral accelerations, wherein measurement equations are defined by time-difference of arrival equations, with random noise characterizing the error in TOA measurements.

32. A multilateration target tracking system using varying receiver combinations, comprising:

a plurality of sensors for receiving a first signal from an aircraft, the first signal including an address corresponding to aircraft identification;

means, coupled to the plurality of sensors, for generating a time stamp indicating when the first signal is received at each of the plurality of sensors;

a program memory for recording a sensor combination used in a previous track update process; and determination means for determining an optimal sensor combination for a measurement equation in an extended Kalman Filter model, wherein the determination means uses a same sensor combination as a previous measurement to improve track accuracy and smoothness, wherein if a same sensor combination as a previous measurement cannot be found, but a common subset of at least three sensors may be found in both measurements, the common subset of sensor combination is used to calculate target position, and wherein if a same sensor combination as a previous measurement cannot be found and a common subset of at least three sensors is not found in both measurement, a sensor combination with the lowest Horizontal Dilution Of Precision (HDOP) will be chosen.

33. A multilateration target tracking system for correlating different message modes, said system comprising:

a plurality of sensors for receiving a first signal from an aircraft, the first signal including at least one aircraft message received in one of a number of predetermined message modes;

means, coupled to the plurality of sensors, for generating a time stamp (TOA) indicating when the at least one aircraft message is received at each of the plurality of sensors;

a track memory system including track state variables and at least a selective recent history of aircraft messages and sensor data for the target, the selective recent history including at least one or more of TOA with sensor identification, signal strengths, and a list of sensors selected to contribute to tracking solutions, wherein stored aircraft messages in the track memory system are retrieved and compared with new aircraft target messages to correlate different messages in different message modes to a single target.

34. A direct multilateration 2-D target tracking system comprising:

a plurality of sensors for receiving signals from an aircraft;

means, coupled to the plurality of sensors, for generating time stamp data indicating when the signals are received at each of the plurality of sensors;

means for generating aircraft position x-y position data and velocity by multilaterating the time stamp data; and means for filtering the time stamp data using an extended Kalman Filter technique where state variables in the filter are pseudoranges and x-y velocities as state variables in an extended Kalman filtering model.

35. A multilateration target tracking system comprising:

a plurality of sensors for receiving a first signal from an aircraft, the first signal including an address corresponding to aircraft identification;

means, coupled to the plurality of sensors, for generating a time stamp indicating when the first signal is received at each of the plurality of sensors;

means for correcting pseudorange values with atmospheric conditions, including:

means for obtaining an initial multilateration solution from time stamp data to calculate initial raw multilateration solutions without regards to atmospheric conditions, means for estimating initial time stamp correction factors based on the knowledge of atmospheric profile between each sensor and apparent target locations, means for adding initial time stamp correction factors to the time stamp data, and deriving nonlinear equation relating true target height with apparent target height at a given range, wherein the nonlinear equation is solved using the apparent target location as input, for what would be true height and range as seen by each sensor.

36. The multilateration target tracking system of claim 35, further comprising:

means for comparing the preliminary true height and range information and the apparent target range information and estimating the time stamp correction term for each sensor, means for applying the time stamp correction term to each sensor, and means for calculating a new multilateration solution to pinpoint the true target position without correction for refractions.

37. The multilateration target tracking system of claim 36, further comprising:

means for calculating real propagation delay $T_d$ by comparing the new multilateration solution with the initial multilateration solution, wherein if $t_d$ is close to the unmodified pseudorange, then the solution is considered found and if not, new time stamp corrections are computed.

38. A 3-D multilateration target tracking system comprising:

a plurality of sensors for receiving a first signal from an aircraft, the first signal including an address corresponding to aircraft identification;

means, coupled to the plurality of sensors, for generating a time stamp indicating when the first signal is received at each of the plurality of sensors;

means for improving height determination for regions of poor Vertical Dilution Of Precision (VDOP) in a 3D multilateration system; and a height determination algorithm for obtaining better vertical accuracy in places with good Horizontal Dilution Of Precision (HDOP), the algorithm comprising a 2D tracking system, utilizing altitude information contained in Mode C and Mode S messages to perform reliable 2D tracking of horizontal positions, wherein for any given time, a modified set of 3D multilateration equations is formed by setting the x-y position of the target with that given by the 2D tracking system, obtaining a solution of the unknown altitude by a least-squares technique.

39. A direct multilateration target tracking system comprising:

a plurality of sensors for receiving signals from an aircraft;

means, coupled to the plurality of sensors, for generating time stamp data indicating when the signals are received at each of the plurality of sensors;

means for generating aircraft position x-y position data and velocity by multilaterating the time stamp data; and means for selecting at least one of a best receiver combination and solution of multilateration equations from a multitude of combinations and solutions.

40. The target tracking system of claim 39, wherein said means for selecting at least one of a best receiver combination and solution of multilateration equations from a multitude of combinations and solutions further comprises:
a consistency checking algorithm for performing error detection and correction when more than four sensors present TOAs for the same target, by checking consistencies among solutions generated by selective sensor combinations, wherein if inconsistency is found, further tests are performed to determine which sensor should not contribute to a final solution of the best receiver combination and solution of multilateration equations.

41. The target tracking system of claim 40, wherein when only four sensors present TOAs for the same target, the consistency checking algorithm indicates an error and the message will not be used for track update if inconsistency in TOAs is detected.

42. The target tracking system of claim 39, wherein said means for selecting at least one of a best receiver combination and solution of multilateration equations from a multitude of combinations and solutions further comprises:
means for perform ambiguity resolution and false target elimination comprising:
means for taking a majority-vote among data coming at different times with different sensor combinations such that although each sensor combination may yield two valid solutions, a true target position centers around solutions taken by majority votes.

43. The target tracking system of claim 39, wherein said means for selecting at least one of a best receiver combination and solution of multilateration equations from a multitude of combinations and solutions further comprises:
means for perform ambiguity resolution and false target elimination comprising:
means for tracking target speeds from selected sensors, wherein sensor data combination solutions generating a target speed that falls substantially outside the reasonable range of speed for targets that normally appear in those locations are discarded.

* * * * *

UNITED STATES PATENT AND TRADEMARK OFFICE
CERTIFICATE OF CORRECTION

PATENT NO. : 7,132,982 B2 Page 1 of 1
APPLICATION NO. : 10/743042
DATED : November 9, 2006
INVENTOR(S) : Alexander E. Smith et al.

It is certified that error appears in the above-identified patent and that said Letters Patent is hereby corrected as shown below:

On the cover page, item (75), please add the following inventor: --Yingching Eric Yang, Natick, Massachusetts--.

Signed and Sealed this

Twentieth Day of May, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,132,982 B2 | Page 1 of 1 |
| APPLICATION NO. | : 10/743042 | |
| DATED | : November 7, 2006 | |
| INVENTOR(S) | : Alexander E. Smith et al. | |

It is certified that error appears in the above-identified patent and that said Letters Patent is hereby corrected as shown below:

On the cover page, item (75), please add the following inventor: --Yingching Eric Yang, Natick, Massachusetts--.

This certificate supersedes the Certificate of Correction issued May 20, 2008.

Signed and Sealed this

Seventeenth Day of June, 2008

JON W. DUDAS
*Director of the United States Patent and Trademark Office*